(12) United States Patent
Greenberger et al.

(10) Patent No.: US 11,334,914 B2
(45) Date of Patent: May 17, 2022

(54) MAPPING MOBILE DEVICE INTERACTIONS AND LOCATION ZONES IN A VENUE FOR USE IN SENDING NOTIFICATIONS

(71) Applicant: International Business Machines Corporation, Armonk, NY (US)

(72) Inventors: Jeremy A. Greenberger, San Jose, CA (US); Zachary Greenberger, Raleigh, NC (US); Matthew J. Margolis, Raleigh, NC (US); Ciaran Hannigan, Morrisville, NC (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 137 days.

(21) Appl. No.: 16/021,875

(22) Filed: Jun. 28, 2018

(65) Prior Publication Data

US 2020/0005356 A1   Jan. 2, 2020

(51) Int. Cl.
*G06Q 30/02* (2012.01)
*G06Q 30/06* (2012.01)
*H04M 1/72457* (2021.01)

(52) U.S. Cl.
CPC ..... *G06Q 30/0255* (2013.01); *G06Q 30/0261* (2013.01); *G06Q 30/0623* (2013.01); *H04M 1/72457* (2021.01)

(58) Field of Classification Search
None
See application file for complete search history.

(56) References Cited

U.S. PATENT DOCUMENTS

| | | |
|---|---|---|
| 5,287,266 A | 2/1994 | Malec et al. |
| 6,529,159 B1 | 3/2003 | Fan et al. |
| 6,571,279 B1 | 5/2003 | Herz et al. |
| 6,587,835 B1 | 7/2003 | Treyz et al. |
| 7,930,204 B1 | 4/2011 | Sharma et al. |

(Continued)

OTHER PUBLICATIONS

IP.com Journal; "System and Method Using a Smart Watch to Determine Person and selected product" Aug. 17, 2016 (Year: 2016).*

(Continued)

*Primary Examiner* — Hajime Rojas
*Assistant Examiner* — Rashida R Shorter
(74) *Attorney, Agent, or Firm* — Stephanie Carusillo; George S. Blasiak; Heslin Rothenberg Farley & Mesiti PC

(57) ABSTRACT

Methods, computer program products, and systems are presented. The methods include, for instance: receiving, by one or more processor, floor area data, zone data, trigger interaction data, and notification data associated with the products offered for sale in the different zones. The method can include receiving, by the one or more processor, triggering event data regarding a product or products in response to user interaction with a mobile device in the venue and location data of the mobile device in the venue at the time of the triggering event data, automatically determining whether the received triggering event data and the (Continued)

received location data match an associated zone data and trigger interaction data, and automatically sending an associated notification to the mobile device regarding purchase of a product or products in the venue.

20 Claims, 14 Drawing Sheets

(56) References Cited

U.S. PATENT DOCUMENTS

| | | | | |
|---|---|---|---|---|
| 9,538,332 | B1* | 1/2017 | Mendelson | H04W 4/90 |
| 10,140,820 | B1* | 11/2018 | Zalewski | G07G 1/0072 |
| 2002/0062251 | A1 | 5/2002 | Anandan et al. | |
| 2004/0002897 | A1 | 1/2004 | Vishik | |
| 2011/0029364 | A1* | 2/2011 | Roeding | G06Q 30/00 |
| | | | | 705/14.16 |
| 2011/0060652 | A1 | 3/2011 | Morton | |
| 2011/0093339 | A1* | 4/2011 | Morton | G06Q 30/02 |
| | | | | 705/14.58 |
| 2011/0238476 | A1 | 9/2011 | Carr et al. | |
| 2013/0179265 | A1 | 7/2013 | Winslade | |
| 2013/0218721 | A1* | 8/2013 | Borhan | G06Q 20/322 |
| | | | | 705/26.41 |
| 2015/0002388 | A1* | 1/2015 | Weston | G06F 3/017 |
| | | | | 345/156 |
| 2015/0039458 | A1* | 2/2015 | Reid | G06K 9/00335 |
| | | | | 705/26.1 |
| 2015/0170205 | A1 | 6/2015 | Scholl | |
| 2017/0005974 | A1* | 1/2017 | Wheeler | H04L 51/24 |
| 2018/0218351 | A1* | 8/2018 | Chaubard | H04N 7/181 |
| 2020/0118400 | A1* | 4/2020 | Zalewski | G06Q 30/0633 |

OTHER PUBLICATIONS

IBM Presence Insights: "Customer insights everywhere", printout available on May 27, 2018, at https://www-01.ibm.com/common/ssi/cgi-bin/ssialias?htmlfid=ZZJ12364USEN, 1 page, at least as early as May 27, 2018.

S. Duri, "An approach to providing a seamless end-user experience for location-aware applications." In Proceedings of the 1st international workshop on Mobile commerce (WMC '01), M. Devarakonda, (Ed.). ACM, New York, NY, USA, 20-25, 2001.

M. Garry, "Location, Location, Location." independentgrocernetwork.com, Progressive Grocer Independent, pp. 15-18, Apr. 2014. www.advancingretail.org/sites/default/files/resources/Location-Location-Location.pdf.

Anonymous, "Detection of focused vs. wanderer customers based on in-store movement trackings." IP.com Disclosure No. IPCOM000234099D, Publication Date: Jan. 12, 2014.

C. Kirmizibayrak, "Installation of Geofences Responsive to Ad Selection." IP.com Disclosure No. IPCOM000251297D, Publication Date: Oct. 29, 2017.

D. Klabjan, "In-store one-to-one marketing." Journal of Retailing and Consumer Services, 18: 1, pp. 64-73, 2011.

Z. Miners, "Location tracking will change the way you shop." IDG News Service | Oct. 10, 2013. https://www.computerworld.com/article/2485920/search/location-tracking-will-change-the-way-you-shop.html [Accessed Jan. 15, 2018].

* cited by examiner

| ROW | ZONE (PRODUCTS) 520 | TRIGGER INTERACTION (WEB BROWSING) 530 | TRIGGER INTERACTION (PRODUCT PHYSICAL) 540 | ACTION (NOTIFICATION) 550 | ACTION (OTHER THAN NOTIFICATION) 560 |
|---|---|---|---|---|---|
| 1 | A (Digital Cameras) | Browse app for similar products | Any | Send Promo Notification for DSLR Camera | |
| 2 | A (Digital Cameras) | Browse app for similar products | User manually holds Camera | | Activate short range radio link |
| 3 | B (Computers) | Search for photo editing software | Any | Send promo Photo App | |
| 4 | B (Computers) | Search for photo editing software | User reads Product label | | Activate short range radio link |
| 5 | B (Computers) | Search for computer mice | Any | Send 5% off promo for Mouse | |
| 6 | B (Computers) | Any | User manually holds Product | | Activate short range radio link |
| 7 | C (Video Games) | Search for better prices on a game | Any | Give 5 dollars off coupon for games | |
| 8 | C (Video Games) | Any | User reads Product label | | Activate short range radio link |

FIG. 5

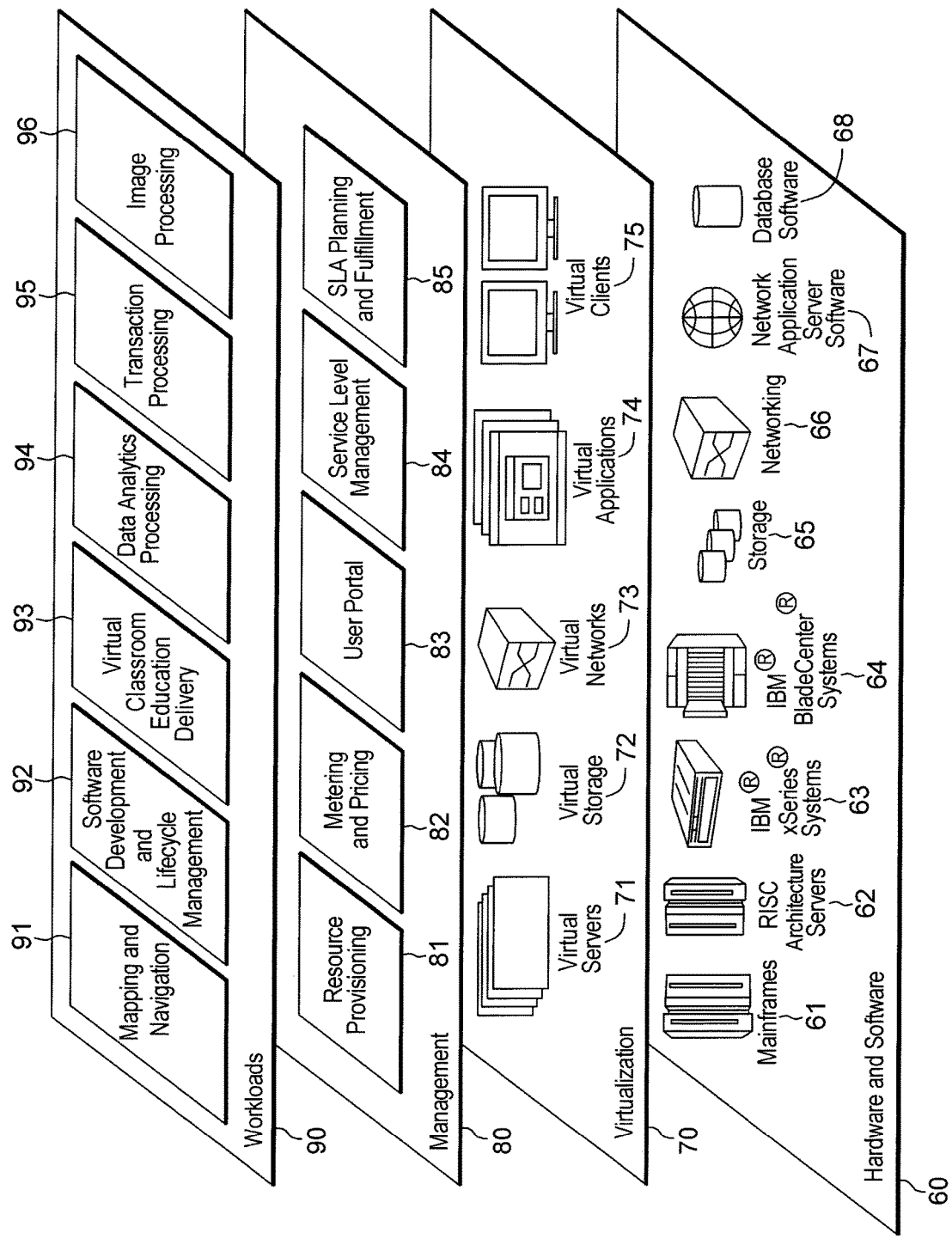

МАPPING MOBILE DEVICE INTERACTIONS AND LOCATION ZONES IN A VENUE FOR USE IN SENDING NOTIFICATIONS

BACKGROUND

Location based services (LBS) are software services that use location data to control functionality of computer systems. LBS information services have a number of uses, e.g. in social networking, entertainment, security, and in a plurality of additional applications. LBS services employ location services for locating mobile computer systems. Location services can incorporate a variety of different locating service technologies such as the Global Positioning System (GPS), cellular network locating technologies, and WiFi based locating technologies, and other technologies. One example of an LBS is a location based messaging services wherein notifications and other messages to users can be in dependence on the respective locations of the users.

SUMMARY

Shortcomings of the prior art are overcome, and additional advantages are provided, through the provision, in one aspect, of a computer implemented method. The method can include, for example: receiving, by one or more processor, floor area data corresponding to a floor area of a venue, receiving, by the one or more processor, zone data corresponding to a plurality of different zones of the floor area of the venue, receiving, by the one or more processor, trigger interaction data corresponding to mobile device interaction associated with products offered for sale in each of the plurality of different zones in the venue, receiving, by the one or more processor, notification data associated with the products offered for sale in the plurality of different zones in the venue, receiving, by the one or more processor, triggering event data regarding a product or products in response to user interaction with a mobile device in the venue, receiving, by the one or more processor, location data of the mobile device in the venue at the time of the triggering event data, automatically determining, by the one or more processor, whether the received triggering event data and the received location data match an associated zone data and trigger interaction data, and automatically sending, by the one or more processor, when the received triggering event data and the received location data matches an associated zone data and trigger interaction data, an associated notification to the mobile device regarding purchase of a product or products in the venue.

In another aspect, a computer program product can be provided. The computer program product can include a computer readable storage medium readable by one or more processing unit and storing instructions for execution by one or more processor for performing a method. The method can include, for example: receiving, by one or more processor, floor area data corresponding to a floor area of a venue, receiving, by the one or more processor, trigger interaction data corresponding to mobile device interaction associated with products offered for sale in each of the plurality of different zones in the venue, receiving, by the one or more processor, notification data associated with the products offered for sale in the plurality of different zones in the venue, receiving, by the one or more processor, triggering event data regarding a product or products in response to user interaction with a mobile device in the venue, receiving, by the one or more processor, location data of the mobile device in the venue at the time of the triggering event data, automatically determining, by the one or more processor, whether the received triggering event data and the received location data match an associated zone data and trigger interaction data, and automatically sending, by the one or more processor, when the received triggering event data and the received location data matches an associated zone data and trigger interaction data, an associated notification to the mobile device regarding purchase of a product or products in the venue.

In a further aspect, a system can be provided. The system can include, for example a memory. In addition, the system can include one or more processor in communication with the memory. Further, the system can include program instructions executable by the one or more processor via the memory to perform a method. The method can include, for example: receiving, by one or more processor, floor area data corresponding to a floor area of a venue, receiving, by the one or more processor, zone data corresponding to a plurality of different zones of the floor area of the venue, receiving, by the one or more processor, trigger interaction data corresponding to mobile device interaction associated with products offered for sale in each of the plurality of different zones in the venue, receiving, by the one or more processor, notification data associated with the products offered for sale in the plurality of different zones in the venue, receiving, by the one or more processor, triggering event data regarding a product or products in response to user interaction with a mobile device in the venue, receiving, by the one or more processor, location data of the mobile device in the venue at the time of the triggering event data, automatically determining, by the one or more processor, whether the received triggering event data and the received location data match an associated zone data and trigger interaction data, and automatically sending, by the one or more processor, when the received triggering event data and the received location data matches an associated zone data and trigger interaction data, an associated notification to the mobile device regarding purchase of a product or products in the venue.

Additional features are realized through the techniques set forth herein. Other embodiments and aspects, including but not limited to methods, computer program product and system, are described in detail herein and are considered a part of the claimed invention.

BRIEF DESCRIPTION OF THE DRAWINGS

One or more aspects of the present invention are particularly pointed out and distinctly claimed as examples in the claims at the conclusion of the specification. The foregoing and other objects, features, and advantages of the invention are apparent from the following detailed description taken in conjunction with the accompanying drawings in which:

FIG. 5 is a table of associated zones, trigger interaction, and notifications according to one embodiment.

FIG. 14 depicts abstraction model layers according to one embodiment.

DETAILED DESCRIPTION

Figure 1:
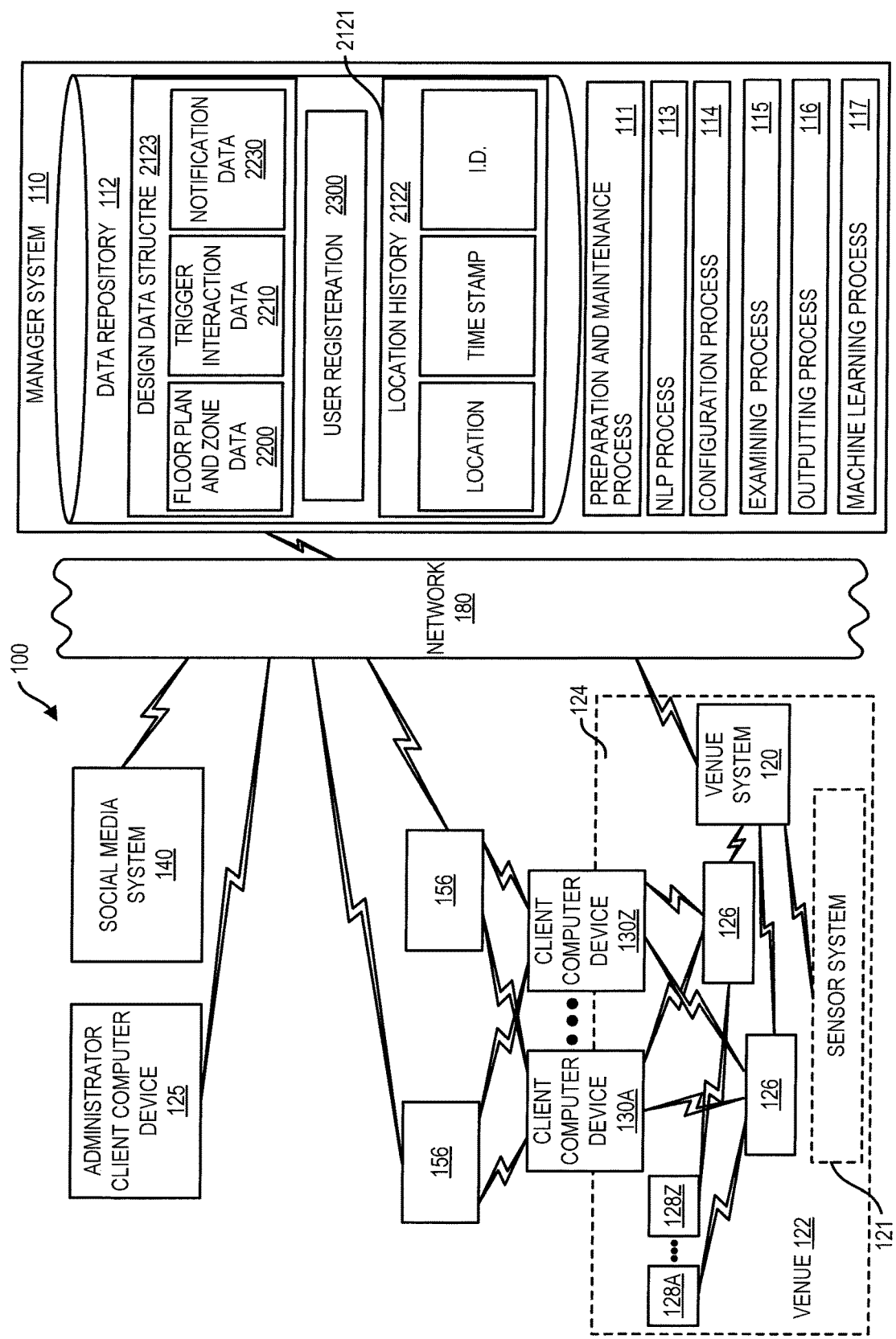
FIG. 1 depicts a system having manager system a venue system and computer devices according to one embodiment.

FIG. 1 illustrates a system 100 for use in supporting location based and user triggering event messaging services. System 100 can include manager system 110 having an associated data repository 112, client computer devices 130A-130Z, venue system 120, administrator client computer device 125, and social media system 140, which can be connected to and in communication with one another via network 180, which can include one or more of a physical network or a virtual network. Venue system 120 can be disposed in a venue 122 delimited by spatial geographical border 124.

Client computer devices 130A-130Z can be in communication with network 180, e.g. via connecting nodes 156 and/or connecting nodes 126 which connecting nodes 126 can be in communication with venue system 120 which in turn is in communication with network 180. Connecting nodes 156 can be e.g. connecting nodes of a cellular service wide area network (WAN), connecting nodes 126 can be connecting nodes of a wireless local area network (WLAN). System 100 can include numerous devices, which may be computing node based devices, connected by network 180. Network 180 may be a physical network and/or a virtual network. A physical network can be, for example, a physical telecommunications network connecting numerous computing nodes or systems, such as computer servers and computer clients. A virtual network can, for example, combine numerous physical networks or parts thereof into a logical virtual network. In another example, numerous virtual networks can be defined over a single physical network.

Manager system 110 can determine a current location of client computer devices 130A-130Z employing various locating technologies, e.g. based on radio signals obtained by connecting nodes 156 and/or connecting nodes 126. Within venue 122, there can be disposed one or more sensor system 121 in communication with venue system 120 and in turn with network 180. One or more sensor system 121 can be, e.g. a video camera system which obtains video data of various locations, e.g. in one embodiment comprising an entirety of a patron floor space of venue 122 and which in one embodiment can include additionally or alternatively video cameras disposed in each shopping cart within a venue 122. One or more sensor system 121 can also in one embodiment include, e.g. an RFID sensor system for tracking RFID product disposed within venue 122.

Within venue 122 there can also be disposed a plurality of products 128A-128Z for purchase by patron users having associated client computer devices 130A-130Z. Products 128A-128Z in one embodiment can be absent of electronics but in one embodiment products of the plurality of products 128A-128Z can be Internet of Things (IoT) enabled products. In one embodiment products of the plurality of products 128A-128Z can be arranged in the venue according to categories in zones as described below.

In one embodiment, manager system 110 can be external to and remote from venue system 120 social media system 140, administrator client computer device 125, and to each of the one or more client computer device 130A-130Z for use by users of system 100. In one embodiment manager system 110 can be co-located with venue system 120 and/or social media system 140. In one embodiment manager system 110 can be co-located with administrator client computer device 125, and/or one or more client computer device 130A-130Z. Administrator client computer device 125 can be used by human administrator users of system 100. Client computer devices 130A-130Z can be used by human users of system 100 such as patron users of customers of the venue.

Referring further to FIG. 1, venue system 120 can be located in venue 122 that is delimited by venue geographical border 124 that specifies the geographical coordinate area occupied by venue 122. In one embodiment, an organizational enterprise that operates manager system 110 can be in common with the organizational enterprise that operates venue system 120 and venue 122. Venue 122 can be a retail venue in one embodiment. Venue system 120 can be disposed in venue 122 defined by geographical boundary 124. Client computer devices 130A-130Z can be mobile computer devices, moveable between locations, internal and external to venue 122, and thus are shown in FIG. 1 as being partially disposed within geographical boundary 124 and partially disposed external to geographical boundary 124. Client computer devices 130A-130Z can be wireless computer devices that can be connected to network 180 by alternate radio communication protocols. For example, client computer devices 130A-130Z can connect to network 180 by connection nodes 156. Connection nodes 156 can be connection nodes that facilitate connection to a cellular communication network. Client computer devices 130A-130Z can also be connected to network 180 via connection nodes 126. Connection nodes 126 can be provided by IEEE 802.11 access points of a WiFi wireless network provided by an operator of venue system 120, in which operator can be the operator of venue 122 and manager system 110. Client computer devices 130A-130Z can be provided e.g., by smartphones and/or smartwatches.

In one embodiment, each user computer device 130A-130Z can be associated to a certain user. In one embodiment, each user of system 100 is a registered user of a retail vendor that operates a plurality of venues such as venue 122. Users having records stored in user identification area 2300 of data repository 112 can be registered users of manager system 110 and of the vendor, e.g. can be customer loyalty card holders of the vendor, who receive customer loyalty cards in exchange for data regarding themselves.

Each of the different users of client computer devices 130A-130Z can be associated to a different user or patron of the venue. A client computer device of one or more user computer device 130A-130Z, in one embodiment can be a computing node based device provided by a client computer, e.g. a mobile device, e.g. a smartphone or tablet, a laptop, smartwatch that runs one or more program e.g., including a web browser for viewing web pages.

Social media system 140 can include a collection of files, including for example, HTML files, CSS files, image files, and JavaScript files. Social media system 140 can be a social website such as FACEBOOK® (Facebook is a registered trademark of Facebook, Inc.), TWITTER® (Twitter is a registered trademark of Twitter, Inc.), LINKEDIN® (LinkedIn is a registered trademark of LinkedIn Corporation), or INSTAGRAM® (Instagram is a registered trademark of Instagram, LLC). Computer implemented social networks incorporate messaging systems that are capable of receiving and transmitting messages to client computers of participant users of the messaging systems. Messaging systems can also be incorporated in systems that that have minimal or no social network attributes. A messaging system can be provided by a short message system (SMS) text message delivery service of a mobile phone cellular network provider, or an email delivery system.

Manager system 110 can run various processes. For example, manager system 110 can run preparation and maintenance process 111, natural language processing (NLP) process 113, configuring process 114, examining process 115, outputting process 116, and machine learning process 117. Manager system 110 can run preparation and maintenance process 111 to populate and maintain data of data repository 112 for use by manager system 110, including e.g. examining process 115.

Data repository 112 can include decision data structures area 2123 which can include e.g. one or more multidimensional decision table for driving one or more decision, e.g. a decision to send a notification based on a user's location and a user's triggering event. Decision data structure 2123 can include floor plan and zone data area 2200, trigger interaction data area 2210, and notification data area 2220.

Data repository 112 can include location history area 2121. Location history area 2121 can store travel history data for each of a plurality of users of system 100, e.g. user 001, user 002, and so on. Location history data stored in location history area 2121 can include for each of several users, a table 2122. The table 2122 for each user can have such columns as a location column specifying the locations travelled of a user in the venue throughout history of times, a timestamp column specifying a time associated with each location, and an identification column specifying identification of the user at the location. Location data for the user can be sampled at a selected sampling rate, e.g. once per second, once per minute, once per hour, etc. depending on the configuration of system 100 as specified by an administrator user. For providing of location data that specifies a location of users of system 100 over time, system 100 can be configured to provide locating services. Locating services can be, e.g. control plane based, self-reported based, local range based, or a combination of the noted types. In one embodiment, locating services provided by system 100 can be locate a user computer device of user computer devices 130A-130Z using, e.g. GPS based locating services, locating services based on processing of signals received by connection nodes 156 (cellular network), locating services based on processing of signals received by connection nodes 126 (LAN), or a combination of such services. Locating services can additionally or alternatively be image recognition based. For example, manager system 110 can be configured to subject video data obtained from camera system 121 to facial recognition and can identify users based on the performed facial recognition, and can also perform locating of recognized users based on the known locations of cameras of camera system 121, which can be fixed mount as well as the other known view directions of the cameras of camera system 121 and determine positions of features within video data frames.

Manager system 110 can run configuring process 114 to configure parameters of a location based messaging service, based on the triggering event, e.g. based on administrator user configuration defined data that is specified using an administrator user interface. The location based messaging service can be, e.g. a service that outputs a notification to a certain user computer device based on the user computer device being located in a zone and the user undertaking a triggering interaction. As set forth herein an administrator user interface can permit an administrator user to define for a location based messaging service, a time period for which a location based messaging service is active and parameters of a location of interest (e.g. in the case of geofence coordinate locations, perimeter size and shape, in the case of a zone, the zone identifier) actions associated with an event detected for, e.g. notification and/or process initiations, events triggering the providing one or more output, e.g. a breach and/or a dwell.

Manager system 110 can run examining process 115 for determining whether the user's location and triggering event corresponds to an associated notification. Manager system 110 in one embodiment can activate NLP process 113 to examine a triggering event to extract a location specified herein.

Figure 2:
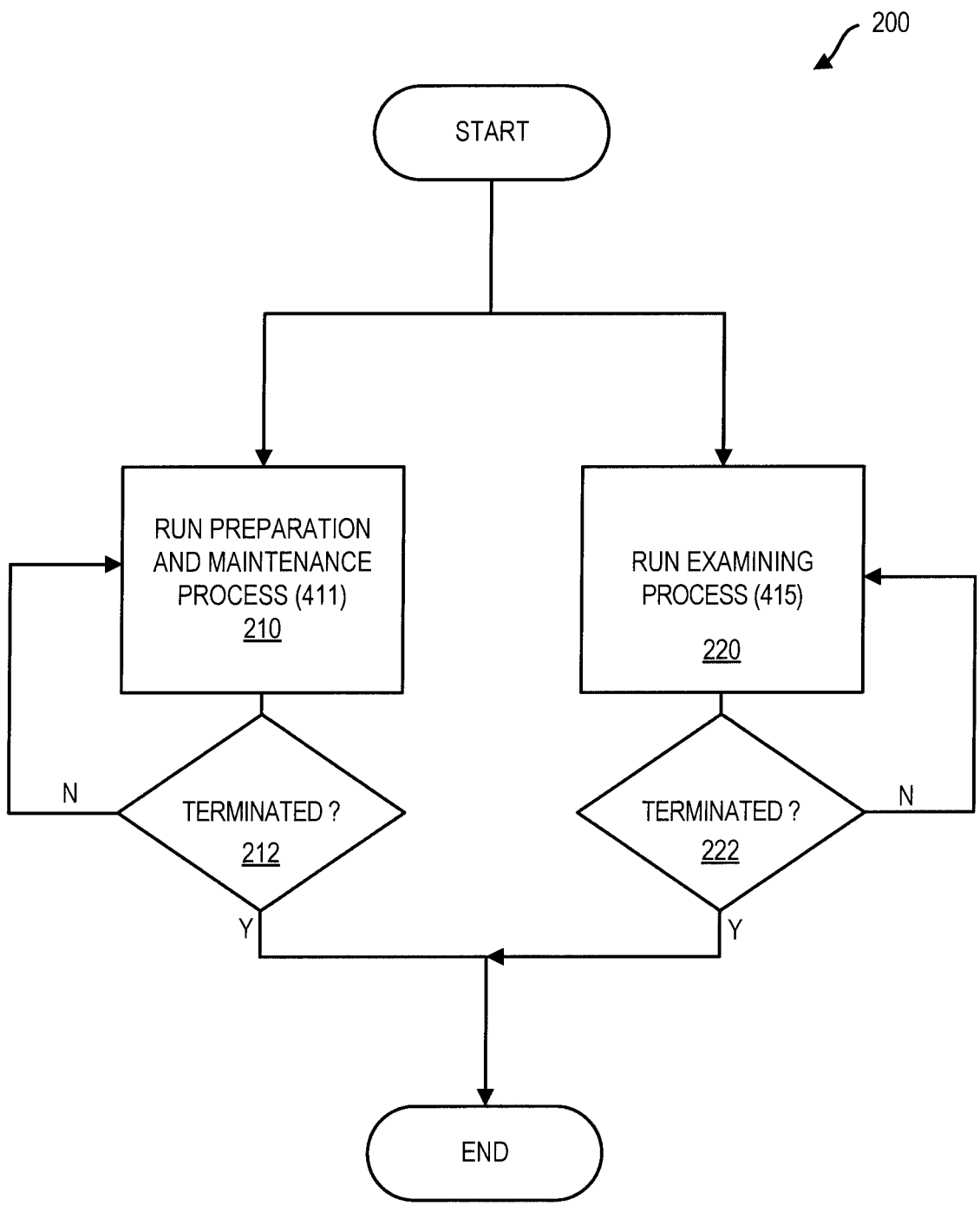
FIG. 2 is flowchart illustrating a method that can be performed by a manager system according to one embodiment.

FIG. 2 illustrates a flowchart of a method 200 for performance by manager system 110 of FIG. 1. At block 210, manager system 110 can run preparation and maintenance process 111 to populate prepare and maintain various data of data repository 112 including data of location history area 2122 (FIG. 1) and decision data structures area 2123. Manager system 110 can run preparation and maintenance process 111 until process 111 is terminated at block 212.

At block 220, manager system 110 can run examining process 115 to examine user triggering event data and location data, and compare the same to zone data and associated notification data. Manager system 110 can run examining process 115 until examining process 115 is terminated at block 222. Manager system 110 can run preparation and maintenance process 111 and examining process 115 concurrently and can run each of process 111 and process 115 iteratively.

Figure 3:
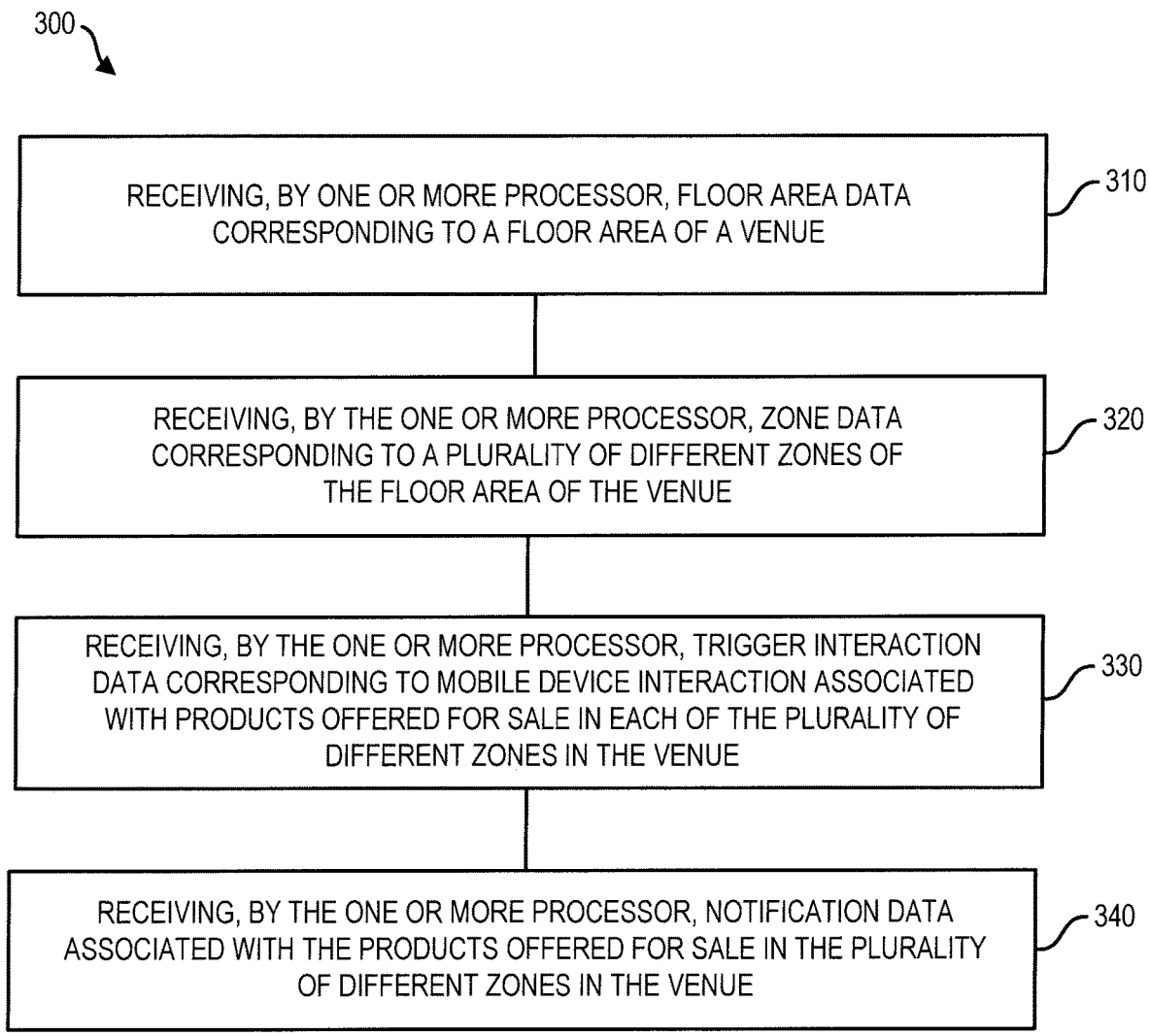
FIG. 3 is flowchart illustrating a method that can be performed by a manager system according to one embodiment.

With reference to FIG. 3, a method 300 for performance by manager system 110 is illustrated. For example, method 300 is operable or mapping a plurality of zones in a venue to correspond products, trigger interactions, and notifications. At block 310, manager system 110 (FIG. 1) can perform receiving, by one or more processor, floor area data corresponding to a floor area of a venue, at 320 receiving, by the one or more processor, zone data corresponding to a plurality of different zones of the floor area of the venue, at 330 receiving, by the one or more processor, trigger interaction data corresponding to mobile device interaction associated with the product data corresponding to products offered for sale in each of the plurality of different zones in the venue, and at 340 receiving, by the one or more processor, notification data associated with the products offered for sale in the plurality of different zones in the venue. Blocks 310 to 340 may be initially performed to set up the method for providing information to a user in a venue upon interact by the user of a mobile device.

Figure 4:
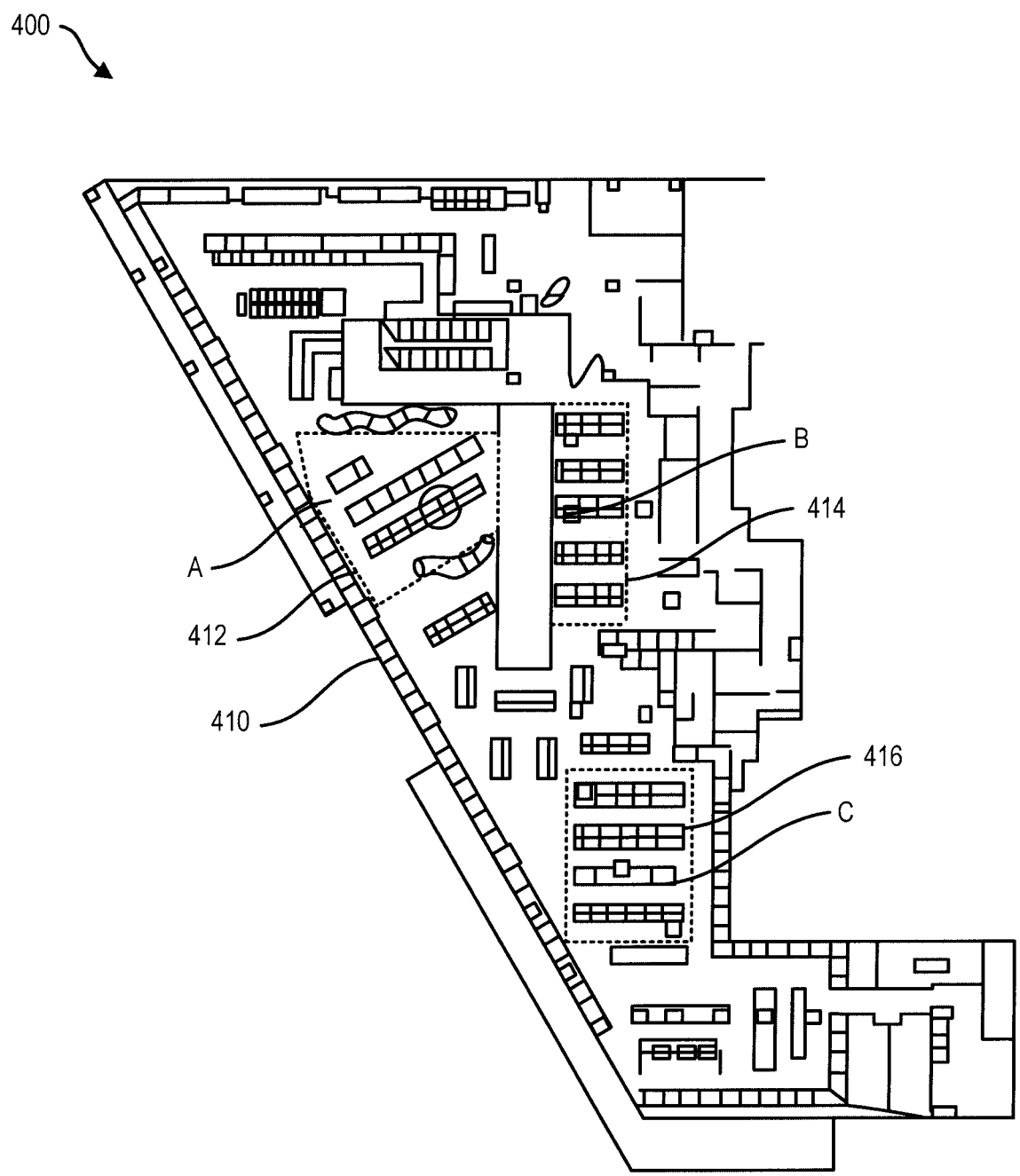
FIG. 4 is plan view of a floor area having different zones of a venue according to one embodiment.

For example, as shown in FIG. 4, a floor area 400 of a venue such as a business that sells various products may include an outer boundary 410 that may be defined by geometric coordinates. Disposed within the outer boundary may be a plurality of subfloor areas or floor area zones A, B, and C, which may also be defined by geometric coordinates having outer boundaries 412, 414, and 416, respectively.

As shown in FIG. 5, a table 500 such as a look-up table may be compiled associating a plurality of rows 510, a plurality of zones 520 in the venue with a plurality of products offered for sale in the plurality of zones in the venue, trigger interactions 530 associated with user interaction with a mobile device such as web browsing, trigger interactions 540 associated with user's physical interaction with products, actions 550, such as notifications associated with the trigger interactions, which may be forwarded to the users' mobile devices while in the zones in the venue and actions 560 such as notification associated with the triggering interactions which may activate a short range radio link such as a notification to a store clerk for helping a customer user. Table 500 may correspond to decision data structure 2123 of data repository 112.

With reference still to FIG. 5, decision data structure or Table 500 can be used in manager system 110 (FIG. 1) to cause the firing of a specified action based on a plurality of conditions being satisfied in combination. For example, referring to the decision data structure of FIG. 5, occupation of zone A combined with trigger interaction "BROWSE APP FOR SIMILAR PRODUCTS" the results in the action of the notification being sent wherein the notification includes text based data stating or specifying "SEND PROMO NOTIFICATION FOR DSLR CAMERA". In the decision data structure of FIG. 5 additional triggering conditions and additional actions may be provided. For example, referring to row 1 of FIG. 5 the firing conditions are the conditions zone A is occupied in the trigger interaction (web browsing) is the interaction "BROWSE APP FOR SIMILAR PRODUCTS." Referring to decision row 1, there is an additional condition specified namely, "carded" which is one of a possible set of physical interactions with a product that can be detected herein among the others including "held", "read", "measured", "carried", and "questioned".

Figure 6:
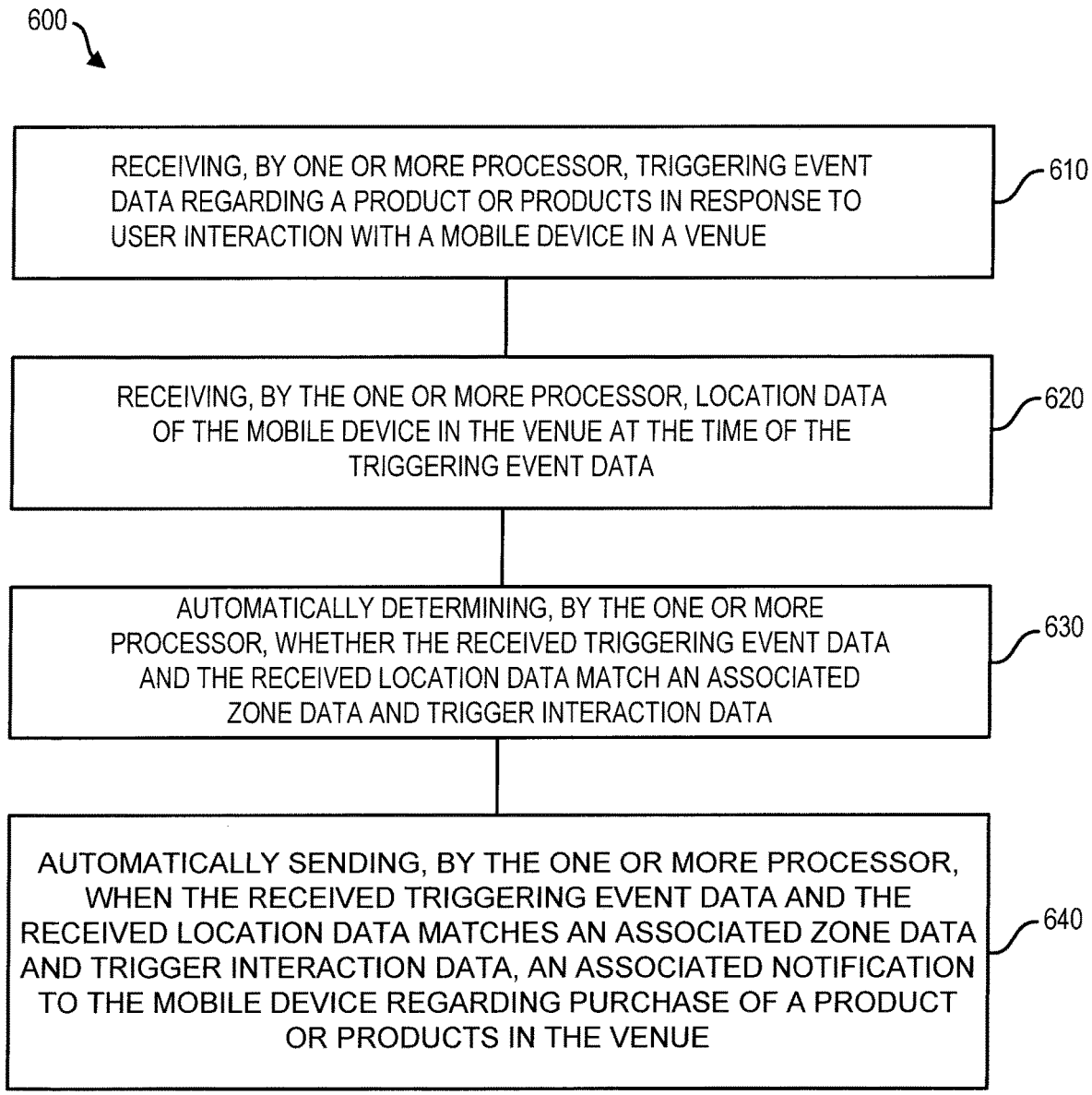
FIG. 6 is flowchart illustrating a method that can be performed by a manager system according to one embodiment.

With reference to FIG. 6, manager system 110 (FIG. 1) can perform at 610 receiving, by the one or more processor, trigger interaction data regarding a product or products in response to user interaction with a mobile device in the venue, at 620 receiving, by the one or more processor, location data of the mobile device in the venue at the time of the triggering event data, at 630 determining, by the one or more processor, whether the received triggering event data and the received location data match an associated zone data and trigger interaction data, and at 640 sending, by the one or more processor, when the received triggering event data and the received location data matches an associated zone data and trigger interaction data, an associated notification to the mobile device regarding purchase of a product or products in the venue.

Figure 7:
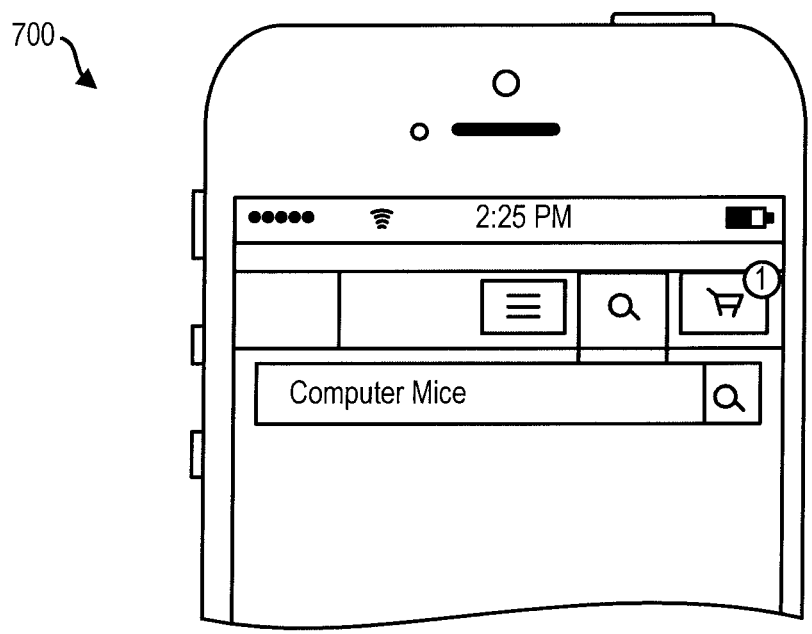
FIG. 7 depicts a portions of a mobile device for effecting an trigger interaction according to one embodiment
Figure 8:
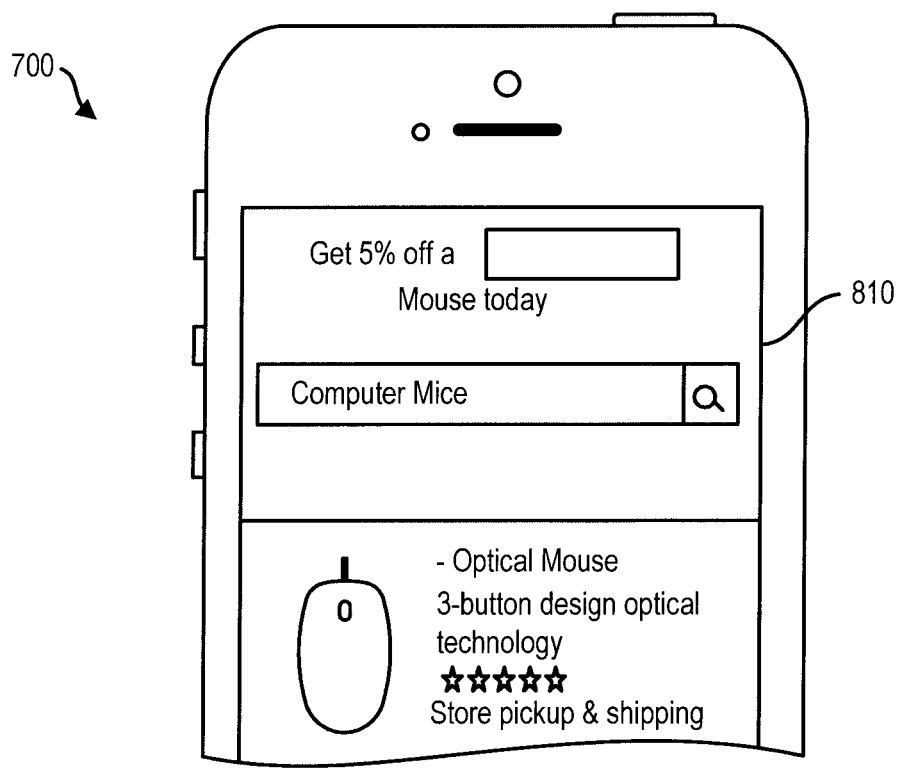
FIG. 8 depicts a portions of a mobile device illustrating a notification according to one embodiment.

For example, as shown in FIG. 7, a mobile devise 700 may be employed by a customer in a venue to search for "computer mice", which may act as a mobile device triggering event. As shown in FIG. 8, mobile device 700 may display a notification 810 indicating "Get 5% off a Mouse today."

The sending may include delaying, by the one or more processor, the sending of the notification based on a predetermined time period after the user interaction with the mobile device resulting in the triggering event data. The determining may include monitoring, by the one or more processor, the location data of the mobile device, and wherein the sending may include sending the notification based on a predetermined time period of the mobile device having been in the zone prior to the occurrence of the triggering event data. The mobile device triggering event data may include use of a browser on the mobile device to a) search for products, b) view a specific product, or c) view a product review. The receiving notification data may include accessing or receiving, by the one or more processor, vender coupons or promotions. The receiving notification data may include accessing or receiving, by the one or more processor, updated vender coupons or promotions at the time when the received triggering event data and the received location data matches an associated zone data and product data. The receiving notification data may include receiving a plurality of different notification data associated with the products offered for sale in each of the plurality of different zones in the venue, and wherein the sending includes selecting one of the plurality of different notifications based on the triggering event data, or randomly selecting one of the plurality of different notification data in response to the triggering event data. The process may further include activating an interactive shelf to alert the user. The process may further include, for example, a user presenting a screen of the mobile device illustrating the notification at the time of purchase of the product in the venue, and completing a sale transaction for the purchase of the product in accordance with the notification. The notification may include a coupon for a discount at the time of sale, or a promotion.

Figure 9:
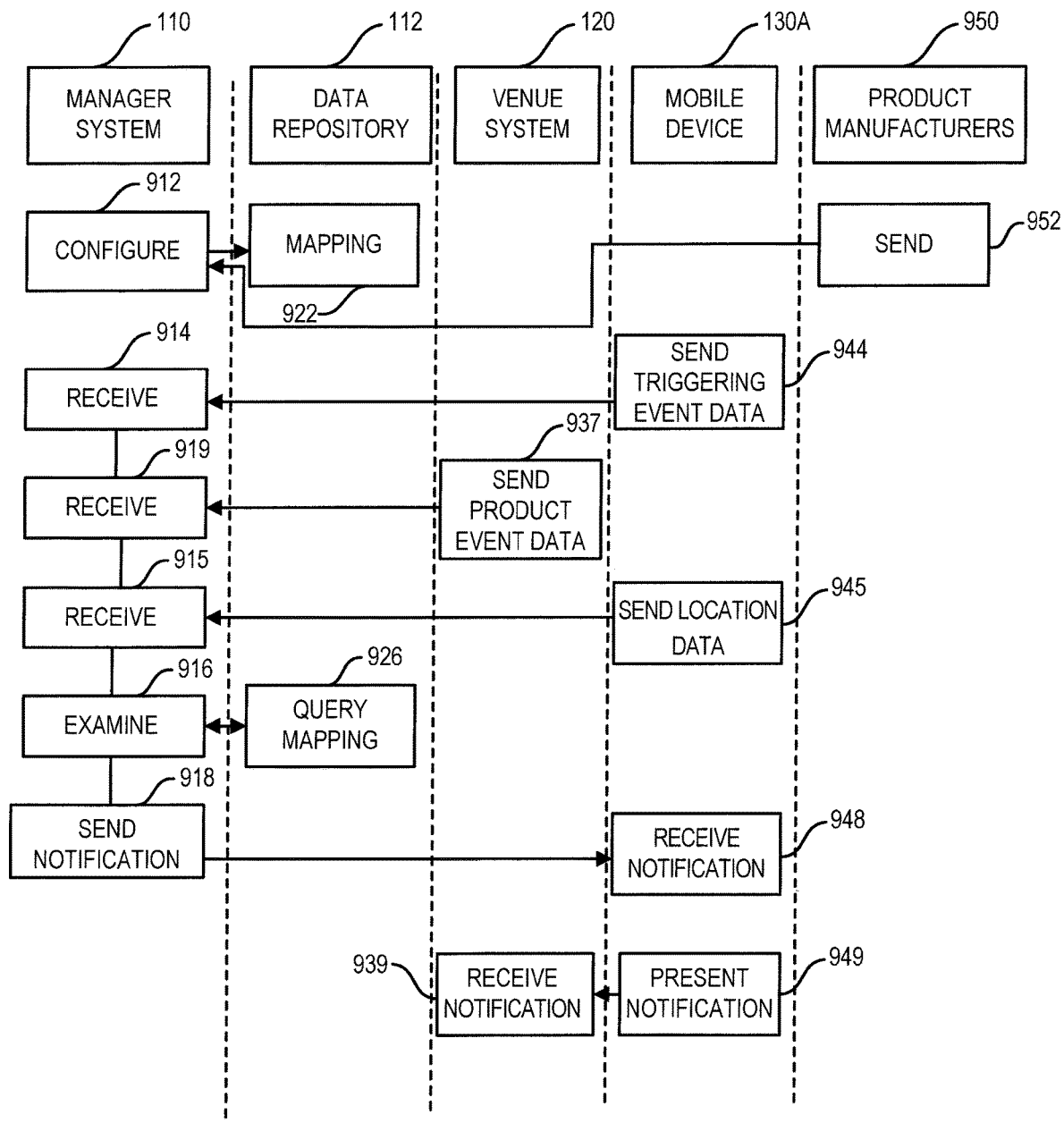
FIG. 9 is flowchart illustrating a method that can be performed by a manager system interoperating with other components according to one embodiment.

FIG. 9 is a diagram illustrating further embodiments of a process regarding customer purchasing and vendor selling in a venue. For example, the process may coordinate locations of users along with mobile device actions by the users in connection with specific products offered for sale in the venue, and send target specific notifications to the user. By way of explanation, in FIG. 9, processes are illustrated from the point of a manager system 110, data repository 112, a venue system 120, mobile devices 130A, and product manufacturers 950.

In one or more embodiments, manager system 110 may run on a different collection of physical or virtual machines or processors, depending on the need for scalability of the system. In one specific example, manager system 110 could run on a single multi-processor server system. In another specific example, various portions of manager system 110 may run on different processors running on different computing nodes. It will be understood that based on a different set or order of inputs manager system 110 can provide different functionality than the functionality described with reference to FIG. 9.

Initially, at block 922, a mapping of associated floor area data corresponding to a floor area of a venue, zone data corresponding to a plurality of different zones of the floor area of the venue, trigger interaction data corresponding to mobile device interaction, trigger interaction data corresponding to physical interactions, and actions such as notification data associated with the products offered for sale in the plurality of different zones in the venue and other than notifications may be provided and stored in data repository 112. For example, manager system 110 may be operable at block 912 to allow a vender or business establishment administrator to configure mapping 922. In other embodiment, at block 952, a product manufacturer may be operable to send notifications such as provide updates regarding specials or new products over time to manager system 110 which may be used in the mapping at block 922. In some embodiments, the mapping may be a look-up table.

At block 944, mobile device 130A upon action by a user using the mobile device may at block 944 send a triggering event data and at block 945 send location data to manager system 110, which are received at blocks 914 and 915, respectively. Manager system 110 may examine at block 916 the received triggering event data and received location data and compare the same by querying the mapping at block 926. If the received the received triggering event data and received location data satisfy the requirements of the mapping, a corresponding notification is sent at block 918 to mobile device 130A, which is received at mobile device 130A at block 948.

A user may present the notification at block 949 such as present a display screen of the mobile device with the notification such as a coupon or promotions upon checkout in the venue, which may be linked to venue system 120 at block 939 in connection with purchase of a product.

Figure 10:
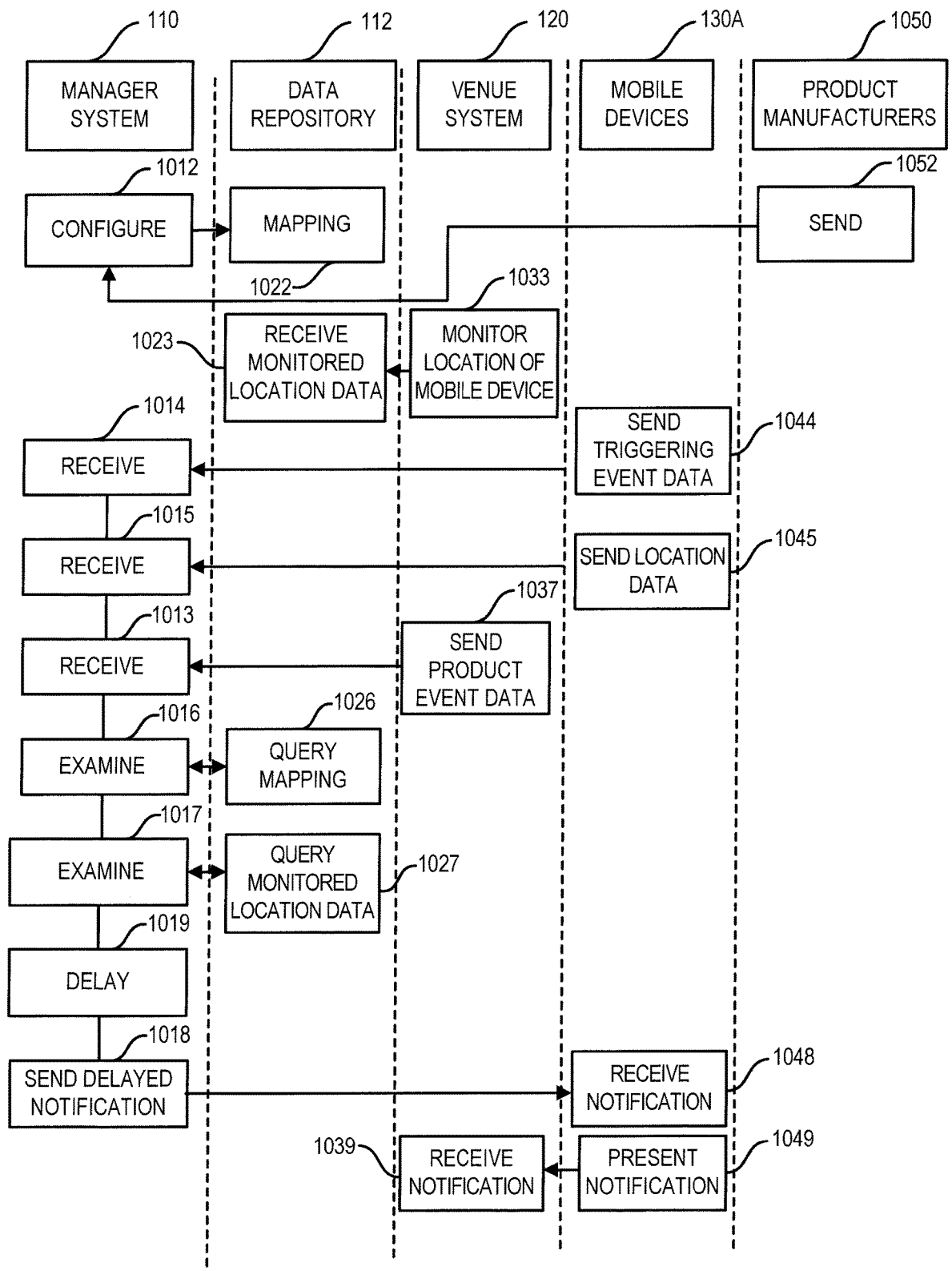
FIG. 10 is flowchart illustrating a method that can be performed by a manager system interoperating with other components according to one embodiment.

FIG. 10 is a diagram illustrating further embodiments of a process regarding customer purchasing and vendor selling in a venue. For example, the process may coordinate locations of users along with actions by the users in connection with specific products offered for sale in a venue, and target specific notifications to the user. By way of explanation, in FIG. 10, processes are illustrated from the point of a manager system 110, data repository 112, a venue system 120, mobile device 130A, and product manufacturers 1050. In this illustrated process, the location of the user/customers and/or their mobile devices may be monitored over time, and delays may be provided before sending the notifications.

In one or more embodiments, manager system 110 may run on a different collection of physical or virtual machines or processors, depending on the need for scalability of the system. In one specific example, manager system 110 could run on a single multi-processor server system. In another specific example, various portions of manager system 110 may run on different processors running on different computing nodes. It will be understood that based on a different set or order of inputs manager system 110 can provide different functionality than the functionality described with reference to FIG. 10.

Initially, at block 1022, a mapping of associated floor area data corresponding to a floor area of a venue, zone data corresponding to a plurality of different zones of the floor area of the venue, trigger interaction data corresponding to mobile device interaction, and actions such as notification data associated with the products offered for sale in the plurality of different zones in the venue and other than notifications may be provided and stored in data repository 112. For example, manager system 110 may be operable at block 1012 to allow a vender or business establishment administrator to configure mapping 1022. In other embodiment, at block 1052, a product manufacturer may be operable to send notifications such as provide updates regarding specials or new products over time to manager system 110 which may be used in the mapping at block 1022. In some embodiments, the mapping may be a look-up table.

Venue system 120 may be provided with a locating system for monitoring at block 1033 the locations of customers and/or mobile devices in the various zones of the venue, which monitored location may be stored in data repository 112 at block 1023. At block 1044, mobile device 130A upon action by a user using the mobile device may send a triggering event data and at block 1045 send location data to manager system 110, which are received at blocks 1014 and 1015, respectively. Manager system 110 may examine at block 1016 the received triggering event data and received location data and examine the same at block 1016 by querying the mapping at block 1026. In addition, manager system 110 may examine the received monitored location data at block 1017 by querying the monitored location data at block 1027.

If the received triggering event data and received location data satisfy the requirements of the mapping, a delay at block 1019 may be provide before sending a corresponding notification at block 1018 to mobile device 640, which is received at mobile device 130A at block 1048. The delay allow for the user to desirably finish the triggering event or using the mobile device before sending the notification. For example, the delay may be 30 second 1 minute, 2 minutes, of other suitable time delay.

A user may present the notification at block 1049 such as present a display screen of the mobile device with the notification such as a coupon or promotions upon checkout in the venue, which may be linked to venue system 120 at block 1039 in connection with purchase of a product.

With reference to FIGS. 9 and 10 in connection with FIG. 1, venue system 120 can send product interaction data. At blocks 937 (FIG. 9) and 1037 (FIG. 10) venue system 120 can send product interaction data for receipt by manager system 110 at blocks 919 and 1013, respectively. For example, venue system 120 can send obtained product interaction data obtained from one or more sensor system 121, e.g. an in venue camera sensor system, RFID sensor system, or beacon zone sensor system. In one embodiment one or more sensor system 121 can include an in venue camera video system which is able to obtain high resolution video data of locations throughout venue 122 which can be subject, e.g. to gesture recognition and facial recognition processing. In one embodiment, a venue camera system provided as part of sensor system 121 and recognizing process 114 of manager system 110 can be provided in part by an IBM WATSON® in venue camera recognition system (IBM WATSON is a registered trademark of International Business Machines Corporation). In one embodiment, a venue camera system provided as part of sensor system 121 can include shopping cart video cameras disposed in shopping carts distributed within venue 122. An RFID sensor system of one or more sensor system 121 can decode RFID tags that can be disposed on a product. In addition to product interaction data received at blocks 919 and 1013 manager system 110 can obtain product interaction data in the form of the products sending various other types of product interaction data. In one embodiment, a product can be provided by an IoT enabled product that is able to sense interactions therewith by a user. In one embodiment, a product can include touch sensitive material such as touch sensitive textile material having conductive fibers that produce an electrical signal for processing in response to touch. A product having touch sensitive material can be configured to sense gestures. In one embodiment, a product can include touch sensitive material in accordance JACQUARD touch sensitive material (JACQUARD is a trademark of Google, Inc.).

At blocks 916 (FIG. 9) and 1016 (FIG. 10), manager system 110 can perform examining of sent location data at blocks 945 (FIG. 9) and 1045 (FIG. 10) and triggering event data 944 (FIG. 9) and 1044 (FIG. 10) and/or product event data at block 937 (FIG. 9) and 1037 (FIG. 10) which is received at blocks 915 (FIG. 9) and 1015 (FIG. 10), blocks 914 (FIG. 9) and 1014 (FIG. 10) and/or blocks 919 (FIG. 9) and 1013 (FIG. 10), respectively. Examining at block blocks 916 (FIG. 9) and 1016 (FIG. 10) can include in one embodiment examining received product interaction data to classify a user's interaction with the product into one or more classification. In one embodiment, such a classification can include a binary classification, e.g. manager system 110 at blocks 916 (FIG. 9) and 1016 (FIG. 10) can classify a user's interaction with a product as being "inactive" or "active". Various logic can be employed for the binary classifications of "baseline" or "active". For example, a product interaction can be determined to have graduated into an active state e.g. by a user making physical contact with a product and/or a user's interaction with a product exceeding predetermined period of time. In another embodiment, the logic can be established so that the active classification is triggered after a user physically contacts a product for a predetermined period of time. In one embodiment manager system 110 can perform more granular classifications. For example, manager system 110 at blocks 916 (FIG. 9) and 1016 (FIG. 10) can classify a user's interaction with a product into one of a plurality of different granular nonbinary classifications e.g. classifications of "held", "read", "measured", "carried", "carted" and "questioned". Further descriptions of these classifications and aspects of product interaction data that can yield the various classifications is summarized herein below in Table 1.

TABLE 1

| Interaction Classification | Description | Exemplary Data Processing |
| --- | --- | --- |
| Held | User manually holds a product | e.g. can be detected based on processing of camera image data provided by processing of touch indicating data obtained from product 128A or by camera image data processing obtained from venue system 120. |
| Read | User reads a product label | e.g. video camera image data obtained, e.g. from client computer device 130A and/or venue system 120 can be processed to recognize that a user is reading a product label. A product label reading gesture can also be detected, e.g. with use of data obtained from a gesture detection sensor of client computer device 130A. |
| Measured | User measures a product | e.g. gesture detection processing can be performed, e.g. using video image data obtained from client computer device 130A and/or venue system 120 and/or an output of a gesture sensor of client computer device 130A. Relevant gestures may include, e.g. a "weighing" gesture by a user where a user lifts a product up and down in the air to estimate its weight or an "sizing" gesture by a user where a user holds the users hands out with palms in parallel opposing spaced relation. |
| Carried | User carries a product | e.g. video camera image data obtained e.g. from client computer device 130A and/or venue system 120 can be processed to make a determination of classification under the carried classification. Camera video image data can be cross referenced to location data obtained from a location service, e.g. location data can be obtained from client computer device 130A and/or venue system 120, and/or another source. |
| Carted | User places product in a shopping cart | e.g. video camera image data obtained e.g. from client computer device 130A and/or venue system 120 can be processed to make a determination of classification under the carted classification. An in-store video camera system can include in-shopping cart video cameras in one embodiment. |
| Questioned | User asks a question about a product | e.g. audio data from client computer device 130A can be processed to determine that a user has spoken to a venue agent about a product. |

As will be appreciated, the technique of the present disclosure may be used to create push notifications in conjunction with device location awareness to detect the location of mobile devices in a venue. A venue marketer would identify locations/zones of interest. Marketer maps specific mobile device interactions may be identified to the locations/zones. The marketer then specifies a triggering action based on the completion of the mobile device interaction. The mobile devices and customers move around the venue. The system monitors if a device meets the triggering criteria based on if it performs a specified in-app interaction within its associated location/zone. If the device does not meet the criteria, nothing is done. If the device does meet the criteria, trigger the associated action specified.

An exemplary case may be as follows. A marketing administrator for a retailer or store of electronic products creates a mapping of triggering actions for various locations. A customer shopper is detected dwelling in the computers area/zone. The customer may open the retailer's app and searches for a mouse that is in stock at the store. Because the customer meets the triggering criteria, the customer is sent a push notification alerting the customer of a "5% off a Mouse!"

With the use of a Wi-Fi, the system can enable even more triggering options such as searching on a specific site and accessing certain content as the mobile device grants access to monitor web traffic. Rather than using Wi-Fi zones, boundaries can be used such as Geofence. The system can have a threshold before triggering the event. For example, if a person searches for better prices for a game in the game department, the system can wait a predetermined time such as X seconds until after the action was complete.

Figure 11A:
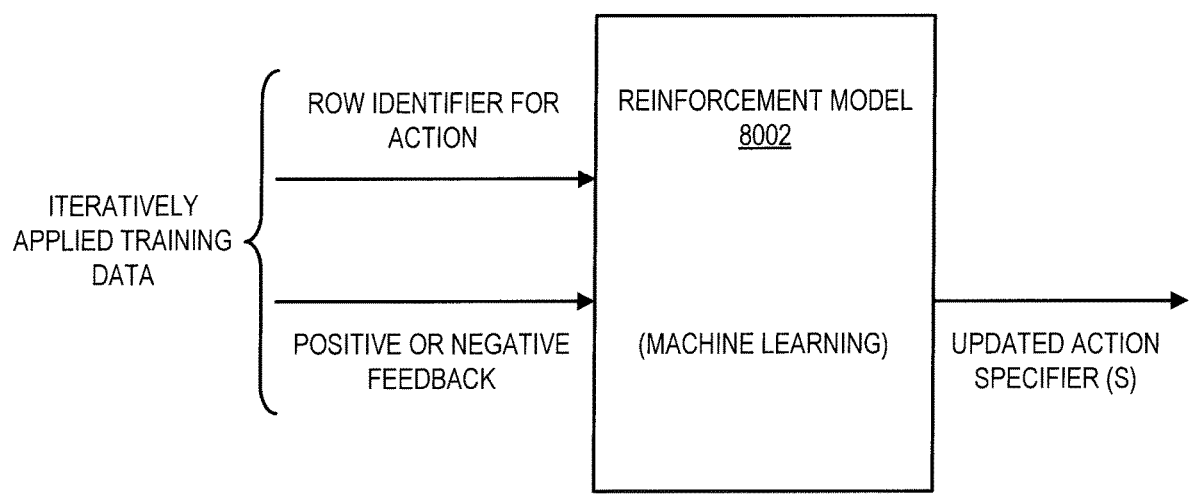
FIG. 11A depicts a predictive model that can be trained by machine learning according to one embodiment.

As set forth herein in reference to block 912, an administrator user can specify mappings between product interaction conditions and actions. In one embodiment, manager system 110 can use a predictive model trained by machine learning to update actions that are specified in a decision data structure 500 such as shown in the decision data structure of FIG. 5. In one embodiment, action specifiers set forth are specified in decision data structures can be iteratively updated by machine learning. FIG. 11A illustrates a machine learning process, in which reinforcement model 8002 is iteratively trained by machine learning.

Training label data input into reinforcement model 8002 can include row identifiers including for each iteration a row identifier specifying the row associated to a current action, e.g. a notification sent to a patron together with a positive or negative feedback label. A positive or negative feedback label specifies whether the action has had a positive or negative effect. For example, embodiments herein recognize that in-venue notifications are tailored to encourage new purchases of products specified in a promotion. The positive or negative feedback can be based on whether the patron actually purchased the product. Accordingly, positive or negative feedback label data can be determined by examining in-venue purchase activity of the patron. If the patron actually purchased a product specified in a promotion, a positive label can be applied. If a patron did not purchase a product, a negative label can be applied. Output of reinforcement model 8002 can be an updated action specifier(s). That is, according to reinforcement model 8002, reinforcement model 8002 can iteratively update an action specifier specified in decision data structure 500.

Reinforcement model 8002 can update an action specifier by confirming a current action specifier or changing the action specifier. Embodiments herein recognize that according to machine learning principles, reinforcement model 8002 can be expected to confirm an existing action specifier specifying a decision data structure 500 provided the action specifier produces a positive result. If however, a positive result is not associated to the specified action, e.g. through one or more iterations, reinforcement model 8002 can update an action specifier to change the action specifier to change the action specifier to specify a new action, e.g. a different notification, which notification can be selected from a predetermined list, e.g. authored by an administrator user. Manager system 110 running reinforcement model 8002 accordingly can automatically optimize notifications or other actions to patrons.

Figure 11B:
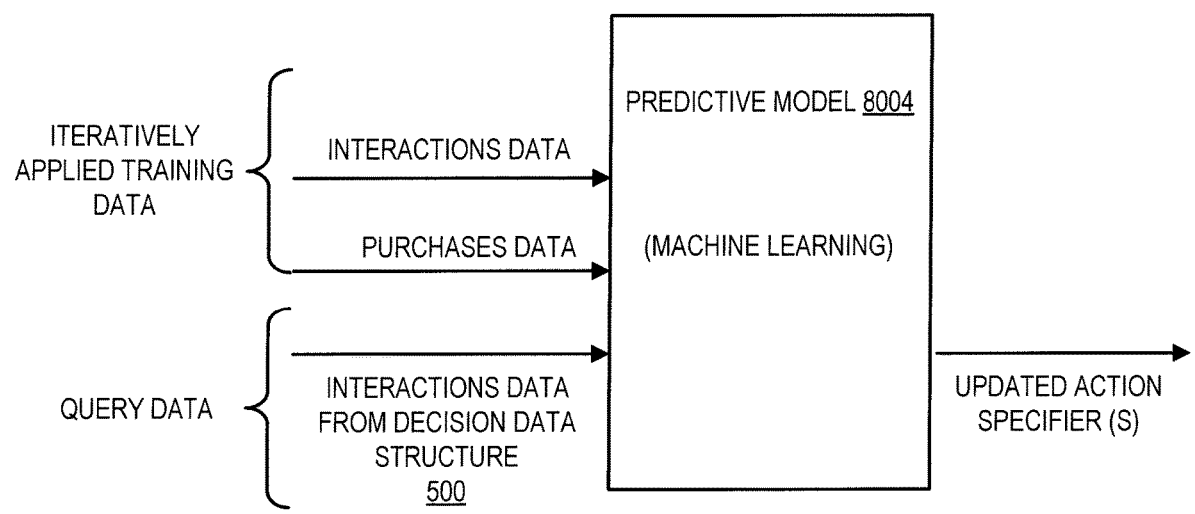
FIG. 11B depicts a predictive model that can be trained by machine learning according to one embodiment.

In another aspect, manager system 110 can specify values within a decision data structure 500 using predictive model 8004 trained by machine learning. Iteratively applied training data applied to predictive model 8004 as set forth in FIG. 11B can include interactions data and purchases data. The iteratively applied interactions data and purchase data need not be data associated to any notification but rather can be generic interactions data and purchases data collected based on the activity of any patron moving within a venue, even if they are patrons not triggering any action specified in a decision data structure. Manager system 110 using predictive model 8004 can track interactions data and purchases data for generic patrons within a venue trained predictive model 8004 and can output an updated action specifier. The updated action output specifier can be mapped to a predicted purchase output by the predictive model 8004. That is, using interactions data and purchase data predictive model 8004 can be configured to predict a purchase that can be made by the patron and that predicted purchase can be mapped to an updated action specifier, e.g. an updated action specifier that specifies sending of a notification promoting the certain product. Iteratively applied interactions data applied to predictive model 8004 can include actions of the type that are specified in decision data structures such as zone occupation interactions and product web browsing and/or physical product interactions. That is, manager system 110 can iteratively track and individual patron activity within a store, e.g. interactions in terms of zone occupation, physical product interaction, and website activity and can apply data of that activity iteratively for each user to predictive model 8004 with purchase data associated to that user.

Predictive model 8004 once trained can be subject to queries using query data. The query data can include pre-specified interactions data from decision data structure 500. That is, interaction conditions specified in various rows of data of decision data structure 500 can be iteratively, e.g. on a scheduled basis applied to predictive model 8004 once trained to output an updated action specified indicated in FIG. 11B. The action specified in decision data structure 500 can thus be updated. In one embodiment, predictive model 8004 can be configured to output a predicted purchase associated to the interactions data input as query data. The predicted product can be mapped to an action specifier, e.g. a notification promoting the certain product.

Various available tools, libraries, and/or services can be utilized for implementation of predictive model 8002. For example, a machine learning service provided by IBM® WATSON® can provide access to libraries of APACHE® SPARK® and IBM® SPSS® (IBM® WATSON® and SPSS® are registered trademarks of International Business Machines Corporation and APACHE® and SPARK® are registered trademarks of the Apache Software Foundation. A machine learning service provided by IBM® WATSON® can provide access set of REST APIs that can be called from any programming language and that permit the integration of predictive analytics into any application. Enabled REST APIs can provide e.g. retrieval of metadata for a given predictive model, deployment of models and management of deployed models, online deployment, scoring, batch deployment, stream deployment, monitoring and retraining deployed models.

Certain embodiments herein may offer various technical computing advantages, involving computer networks operating to provide services to a plurality of users capable of communicating with the network. Embodiments herein relate to improved user interface functionalities, wherein services can be provided to users without express data inputs of a user; for example, services can be provided to a user in some use cases automatically e.g. based on location travel of a user and/or action taken by a user including e.g. physical interactions with objects. Machine learning processes can be performed for increased accuracy and for reduction of reliance on rules based criteria and thus reduced computational overhead. For enhancement of computational accuracies, embodiments can feature computational platforms existing only in the realm of computer networks such as artificial intelligence (AI) platforms, and machine learning platforms. Embodiments herein can employ data structuring processes, e.g. employing Natural Language Processing (NLP) and recognition processing for transforming unstructured data into a form optimized for computerized processing. Embodiments herein can examine data from diverse data sources such as data sources of mobile devices, products, and venues including data sources that process radio signals for location determination of users or for gesture determination. Embodiments herein can include artificial intelligence (AI) processing platforms featuring improved processes to transform unstructured data into structured form permitting computer based analytics and predictive decision making. Embodiments herein can include particular arrangements for both collecting rich data into a data repository and additional particular arrangements for updating such data and for use of that data including by machine learning to drive artificial intelligence decision making.

The present disclosure strives to drive customer engagement, triggering promotions to customers based on their actions within a location of a store, and deliver unique promotions to customers. The present disclosure may increase customer engagement in the shopping experience. For example, when walking through stores, customers are often looking for the best deals they can achieve based on the identified products they are looking for. The present disclosure may provide systems and methods to map mobile device interactions with a location or "zone" in order to produce marketing campaign triggers.

The present systems and methods uses location data and mobile device application events to trigger actions in-store and in real-time. Examples of application events include, but are not limited to, searching for products, viewing a product, and viewing product reviews. In-store actions can include sending a notification for a coupon or promotion, alerting an employee of the location of a needy customer, alerting the customer with a light on a "smart shelf", and other suitable notification and actions for enhancing customer shopping experience.

Figure 12:
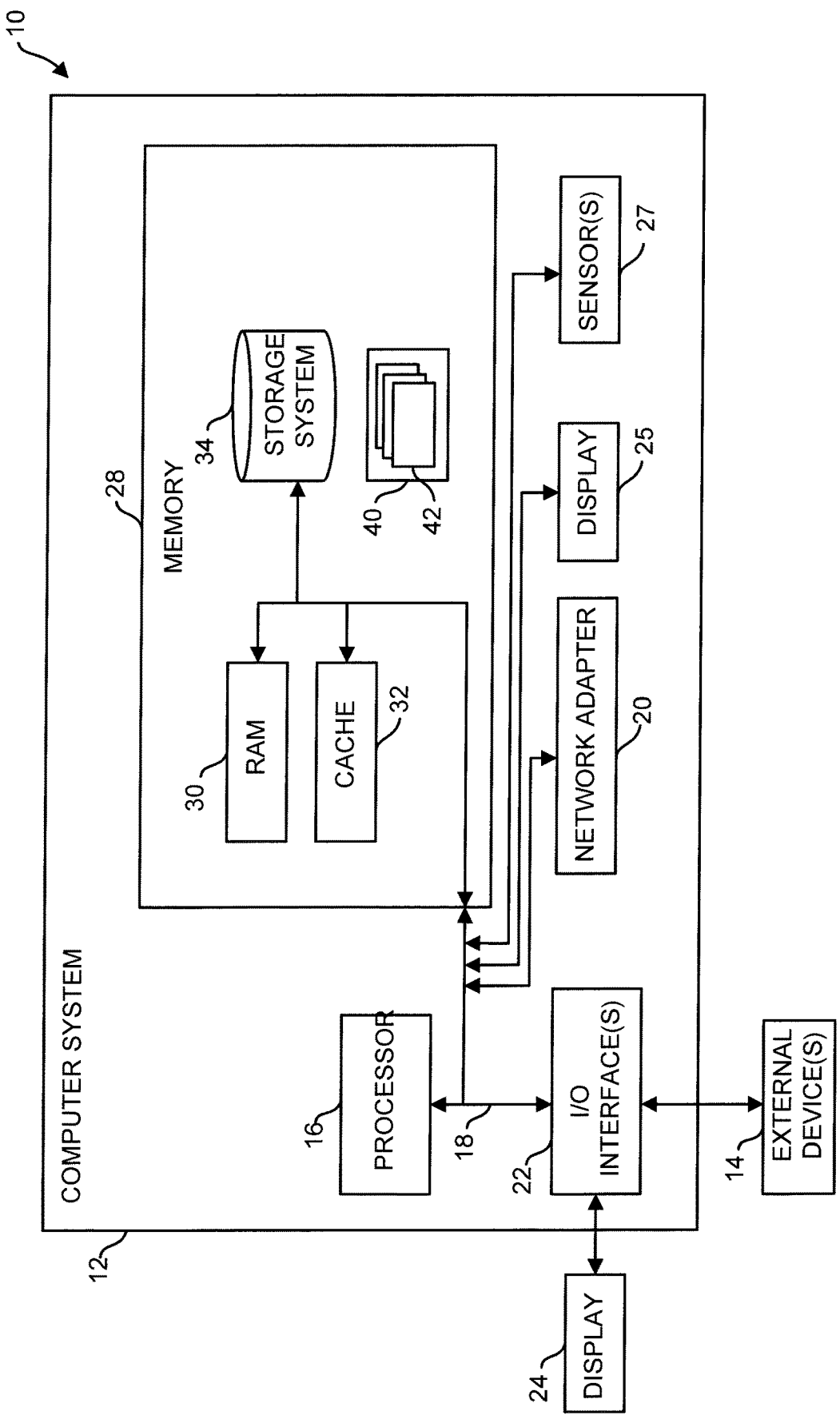
FIG. 12 depicts a computing node according to one embodiment.
Figure 13:
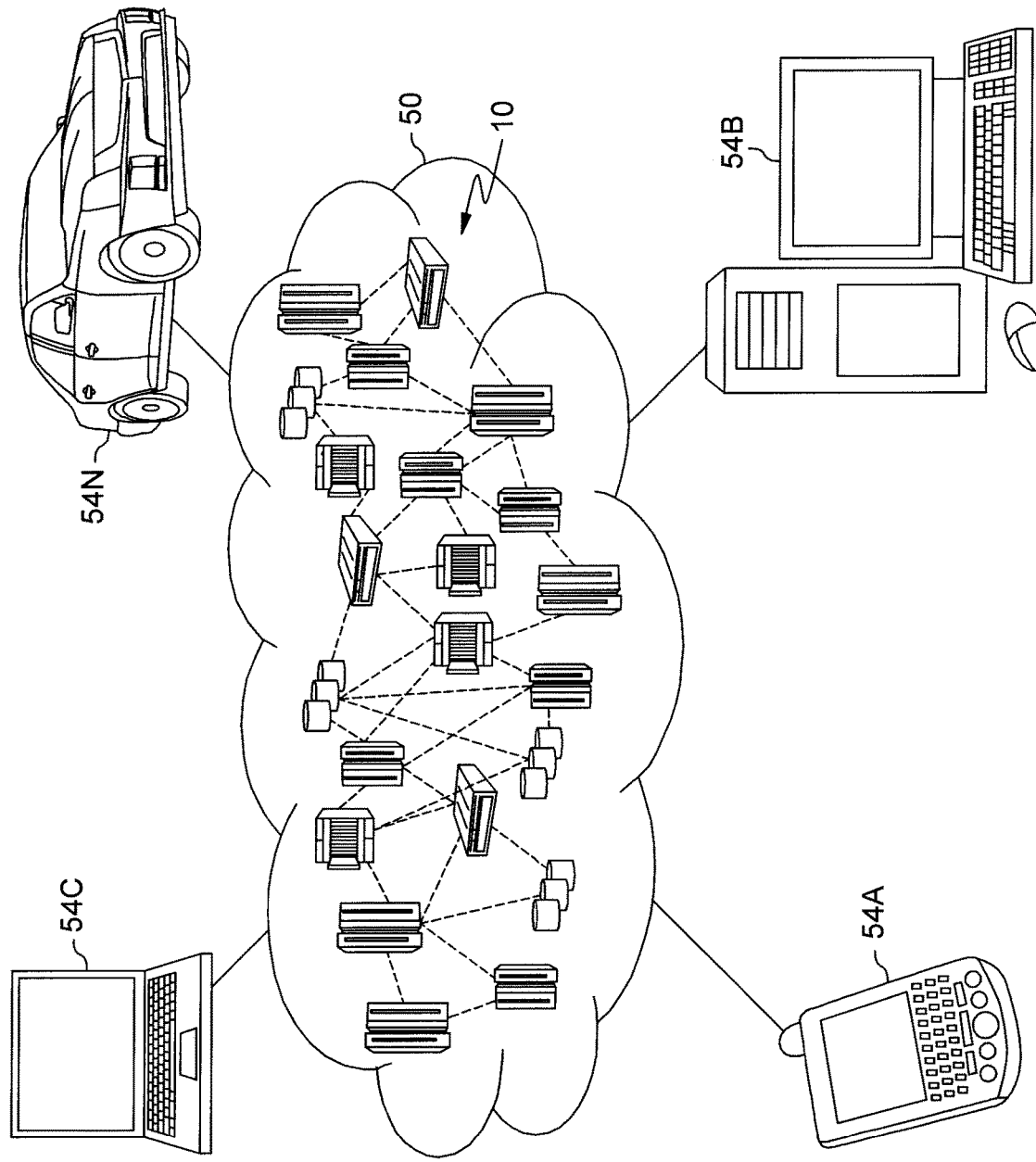
FIG. 13 depicts a cloud computing environment according to one embodiment.

FIGS. 12-14 depict various aspects of computing, including a computer system and cloud computing, in accordance with one or more aspects set forth herein.

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Referring now to FIG. 12, a schematic of an example of a computing node is shown. Computing node 10 is only one example of a computing node suitable for use as a cloud computing node and is not intended to suggest any limitation as to the scope of use or functionality of embodiments of the invention described herein. Regardless, computing node 10 is capable of being implemented and/or performing any of the functionality set forth hereinabove. Computing node 10 can be implemented as a cloud computing node in a cloud computing environment, or can be implemented as a computing node in a computing environment other than a cloud computing environment.

In computing node 10 there is a computer system 12, which is operational with numerous other general purpose or special purpose computing system environments or configurations. Examples of well-known computing systems, environments, and/or configurations that may be suitable for use with computer system 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system 12 may be described in the general context of computer system-executable instructions, such as program processes, being executed by a computer system. Generally, program processes may include routines, programs, objects, components, logic, data structures, and so on that perform particular tasks or implement particular abstract data types. Computer system 12 may be practiced in distributed cloud computing environments where tasks are performed by remote processing devices that are linked through a communications network. In a distributed cloud computing environment, program processes may be located in both local and remote computer system storage media including memory storage devices.

As shown in FIG. 12, computer system 12 in computing node 10 is shown in the form of a general-purpose computing device. The components of computer system 12 may include, but are not limited to, one or more processor 16, a system memory 28, and a bus 18 that couples various system components including system memory 28 to processor 16. In one embodiment, computing node 10 is a computing node of a non-cloud computing environment. In one embodiment, computing node 10 is a computing node of a cloud computing environment as set forth herein in connection with FIGS. 13 and 14.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system 12 typically includes a variety of computer system readable media. Such media may be any available media that is accessible by computer system 12, and it includes both volatile and non-volatile media, removable and non-removable media.

System memory 28 can include computer system readable media in the form of volatile memory, such as random access memory (RAM) 30 and/or cache memory 32. Computer system 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program processes that are configured to carry out the functions of embodiments of the invention.

One or more program 40, having a set (at least one) of program processes 42, may be stored in memory 28 by way of example, and not limitation, as well as an operating system, one or more application programs, other program processes, and program data. One or more program 40 including program processes 42 can generally carry out the functions set forth herein. In one embodiment, manager system 110 can include one or more computing node 10 and can include one or more program 40 for performing functions described with reference to method 300 of FIG. 3, method 600 of FIG. 6, method 700 of FIG. 7, and method 800 of FIG. 8.

Computer system 12 may also communicate with one or more external devices 14 such as a keyboard, a pointing device, a display 24, etc.; one or more devices that enable a user to interact with computer system 12; and/or any devices (e.g., network card, modem, etc.) that enable computer system 12 to communicate with one or more other computing devices. Such communication can occur via Input/Output (I/O) interfaces 22. Still yet, computer system 12 can communicate with one or more networks such as a local area network (LAN), a general wide area network (WAN), and/or a public network (e.g., the Internet) via network adapter 20. As depicted, network adapter 20 communicates with the other components of computer system 12 via bus 18. It should be understood that although not shown, other hardware and/or software components could be used in conjunction with computer system 12. Examples, include, but are not limited to: microcode, device drivers, redundant processing units, external disk drive arrays, RAID systems, tape drives, and data archival storage systems, etc. In addition to or in place of having external devices 14 and display 24, which can be configured to provide user interface functionality, computing node 10 in one embodiment can include display 25 connected to bus 18. In one embodiment, display 25 can be configured as a touch screen display and can be configured to provide user interface functionality, e.g. can facilitate virtual keyboard functionality and input of total data. Computer system 12 in one embodiment can also include one or more sensor device 27 connected to bus 18. One or more sensor device 27 can alternatively be connected through I/O interface(s) 22. One or more sensor device 27 can include a Global Positioning Sensor (GPS) device in one embodiment and can be configured to provide a location of computing node 10. In one embodiment, one or more sensor device 27 can alternatively or in addition include, e.g., one or more of a camera, a gyroscope, a temperature sensor, a humidity sensor, a pulse sensor, a blood pressure (bp) sensor or an audio input device. Computer system 12 can include one or more network adapter 20. In FIG. 13 computing node 10 is described as being implemented in a cloud computing environment and accordingly is referred to as a cloud computing node in the context of FIG. 13.

Referring now to FIG. 13, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 13 are intended to be illustrative only and that computing nodes 10 and cloud computing environment 50 can communicate with any type of computerized device over any type of network and/or network addressable connection (e.g., using a web browser).

Referring now to FIG. 14, a set of functional abstraction layers provided by cloud computing environment 50 (FIG. 13) is shown. It should be understood in advance that the components, layers, and functions shown in FIG. 14 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and processing components 96 for facilitating customer purchasing and vendor selling in a venue as set forth herein. The processing components 96 can be implemented with use of one or more program 40 described in FIG. 12.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowcharts and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

There is set forth herein: A1. A computer implemented method comprising: receiving, by one or more processor, floor area data corresponding to a floor area of a venue; receiving, by the one or more processor, zone data corresponding to a plurality of different zones of the floor area of the venue; receiving, by the one or more processor, trigger interaction data corresponding to mobile device interaction associated with products offered for sale in each of the plurality of different zones in the venue; receiving, by the one or more processor, notification data associated with the products offered for sale in the plurality of different zones in the venue; receiving, by the one or more processor, triggering event data regarding a product or products in response to user interaction with a mobile device in the venue; receiving, by the one or more processor, location data of the mobile device in the venue at the time of the triggering event data; automatically determining, by the one or more processor, whether the received triggering event data and the received location data match an associated zone data and trigger interaction data; and automatically sending, by the one or more processor, when the received triggering event data and the received location data matches an associated zone data and trigger interaction data, an associated notification to the mobile device regarding purchase of a product or products in the venue. A2. The computer implemented method of A1, wherein the sending comprises delaying, by the one or more processor, the sending of the notification based on a predetermined time period after the user interaction with the mobile device resulting in the triggering event data. A3. The computer implemented method of A1, wherein the determining comprises monitoring, by the one or more processor, the location data of the mobile device, and wherein the sending comprises sending the notification based on a predetermined time period of the mobile device having been in the zone prior to the occurrence of the triggering event data. A4. The computer implemented method of A1, wherein the determining comprises monitoring, by the one or more processor, the location data of the mobile device, and wherein the sending comprises sending the notification based on a predetermined time period of the mobile device having been in the zone prior to the occurrence of the triggering event data, and delaying the sending the notification based on a predetermined time period after the user interaction resulting in the triggering event data. A5. The computer implemented method of A1, wherein the triggering event data comprises a) use of a browser on the mobile device to search for products, b) use of a browser on the mobile device to view a specific product, or c) use of a browser on the mobile device to view a product review. A6. The computer implemented method of A1, wherein the receiving notification data comprises accessing or receiving, by the one or more processor, vender coupons or promotions. A7. The computer implemented method of A1, wherein the receiving notification data comprises accessing or receiving, by the one or more processor, updated vender coupons or promotions at the time when the received triggering event data and the received location data matches an associated zone data and triggering interaction data. A8. The computer implemented method of A1, wherein the receiving notification data comprises receiving a plurality of different notification data associated with the products offered for sale in each of the plurality of different zones in the venue, and wherein the sending comprises selecting one of the plurality of different notifications based on the triggering event data, or randomly selecting one of the plurality of different notification data in response to the triggering event data. A9. The method of A1, further comprising: receiving, by the one or more processor, product interaction data corresponding to users' physical interaction associated with products offered for sale in each of the plurality of different zones in the venue; receiving, by the one or more processor, product event data regarding a product or products in response to users' physical interaction with a produce in in the venue; automatically determining, by the one or more processor, whether the received product event data and the received location data match an associated zone data and physical interaction data; and automatically sending, by the one or more processor, when the received product event data and the received location data matches an associated zone data and physical interaction data, an associated notification to the mobile device regarding purchase of a product or products in the venue. A10. The method of A9, wherein the receiving product event data includes receiving product interaction data from a plurality of data sources, wherein the plurality of data sources include two or more of the following selected form the group consisting of: (a) the mobile device of the user; (b) the product, and (c) an in venue video camera system. A11. The computer implemented method of A1, further comprising: presenting a screen of the mobile device illustrating the notification at the time of purchase of the product in the venue; and completing a sale transaction for the purchase of the product in accordance with the notification. A12. The computer implemented method of A11, wherein the notification comprises a coupon for a discount at the time of sale. A13. The computer implemented method of A12, wherein the notification comprises a promotion. B1. A computer program product comprising: a computer readable storage medium readably by one or more processing circuit and storing instructions for execution by one or more processor for performing a method comprising: receiving, by one or more processor, floor area data corresponding to a floor area of a venue; receiving, by the one or more processor, zone data corresponding to a plurality of different zones of the floor area of the venue; receiving, by the one or more processor, trigger interaction data corresponding to mobile device interaction associated with products offered for sale in each of the plurality of different zones in the venue; receiving, by the one or more processor, notification data associated with the products offered for sale in the plurality of different zones in the venue; receiving, by the one or more processor, triggering event data regarding a product or products in response to user interaction with a mobile device in the venue; receiving, by the one or more processor, location data of the mobile device in the venue at the time of the triggering event data; automatically determining, by the one or more processor, whether the received triggering event data and the received location data match an associated zone data and trigger interaction data; and automatically sending, by the one or more processor, when the received triggering event data and the received location data matches an associated zone data and trigger interaction data, an associated notification to the mobile device regarding purchase of a product or products in the venue. B2. The computer program product of B1, wherein the determining comprises monitoring, by the one or more processor, the location data of the mobile device, and wherein the sending comprises sending the notification based on a predetermined time period of the mobile device having been in the zone prior to the occurrence of the triggering event data, and delaying the sending the notification based on a predetermined time period after the user interaction resulting in the triggering event data. B3. The computer program product of B1, wherein the receiving notification data comprises accessing or receiving, by the one or more processor, updated vender coupons or promotions at the time when the received triggering event data and the received location data matches an associated zone data and triggering interaction data. B4. The computer program product of B1, wherein the triggering event data comprises a) use of a browser on the mobile device to search for products, b) use of a browser on the mobile device to view a specific product, or c) use of a browser on the mobile device to view a product review. B5. The computer program product of B1, wherein the method further comprises: receiving, by the one or more processor, product interaction data corresponding to users' physical interaction associated with products offered for sale in each of the plurality of different zones in the venue; receiving, by the one or more processor, product event data regarding a product or products in response to users' physical interaction with a produce in in the venue; automatically determining, by the one or more processor, whether the received product event data and the received location data match an associated zone data and physical interaction data; and automatically sending, by the one or more processor, when the received product event data and the received location data matches an associated zone data and physical interaction data, an associated notification to the mobile device regarding purchase of a product or products in the venue. C1. A system comprising: a memory; at least one processor in communication with memory; and program instructions executable by one or more processor via the memory to perform a method comprising: receiving, by one or more processor, floor area data corresponding to a floor area of a venue; receiving, by the one or more processor, zone data corresponding to a plurality of different zones of the floor area of the venue; receiving, by the one or more processor, trigger interaction data corresponding to mobile device interaction associated with products offered for sale in each of the plurality of different zones in the venue; receiving, by the one or more processor, notification data associated with the products offered for sale in the plurality of different zones in the venue; receiving, by the one or more processor, triggering event data regarding a product or products in response to user interaction with a mobile device in the venue; receiving, by the one or more processor, location data of the mobile device in the venue at the time of the triggering event data; automatically determining, by the one or more processor, whether the received triggering event data and the received location data match an associated zone data and trigger interaction data; and automatically sending, by the one or more processor, when the received triggering event data and the received location data matches an associated zone data and trigger interaction data, an associated notification to the mobile device regarding purchase of a product or products in the venue. C2. The system of C1, wherein the determining comprises monitoring, by the one or more processor, the location data of the mobile device, and wherein the sending comprises sending the notification based on a predetermined time period of the mobile device having been in the zone prior to the occurrence of the triggering event data, and delaying the sending the notification based on a predetermined time period after the user interaction resulting in the triggering event data.

The terminology used herein is for the purpose of describing particular embodiments only and is not intended to be limiting. As used herein, the singular forms "a," "an," and "the" are intended to include the plural forms as well, unless the context clearly indicates otherwise. It will be further understood that the terms "comprise" (and any form of comprise, such as "comprises" and "comprising"), "have" (and any form of have, such as "has" and "having"), "include" (and any form of include, such as "includes" and "including"), and "contain" (and any form of contain, such as "contains" and "containing") are open-ended linking verbs. As a result, a method or device that "comprises," "has," "includes," or "contains" one or more steps or elements possesses those one or more steps or elements, but is not limited to possessing only those one or more steps or elements. Likewise, a step of a method or an element of a device that "comprises," "has," "includes," or "contains" one or more features possesses those one or more features, but is not limited to possessing only those one or more features. Forms of the term "based on" herein encompass relationships where an element is partially based on as well as relationships where an element is entirely based on. Methods, products and systems described as having a certain number of elements can be practiced with less than or greater than the certain number of elements. Furthermore, a device or structure that is configured in a certain way is configured in at least that way, but may also be configured in ways that are not listed.

The corresponding structures, materials, acts, and equivalents of all means or step plus function elements in the claims below, if any, are intended to include any structure, material, or act for performing the function in combination with other claimed elements as specifically claimed. The description set forth herein has been presented for purposes of illustration and description, but is not intended to be exhaustive or limited to the form disclosed. Many modifications and variations will be apparent to those of ordinary skill in the art without departing from the scope and spirit of the disclosure. The embodiment was chosen and described in order to best explain the principles of one or more aspects set forth herein and the practical application, and to enable others of ordinary skill in the art to understand one or more aspects as described herein for various embodiments with various modifications as are suited to the particular use contemplated.

What is claimed is:

1. A system comprising:
   a memory;
   at least one processor in communication with the memory; and
   program instructions executable by one or more processor via the memory to perform a method comprising:
   receiving floor area data corresponding to a floor area of a venue;
   receiving zone data corresponding to a plurality of different zones of the floor area of the venue;
   receiving mobile device browser usage trigger interaction data corresponding to mobile device interaction associated with products offered for sale in each of the plurality of different zones in the venue;
   receiving notification data associated with products for acquisition in the plurality of different zones in the venue;
   receiving mobile device browser usage triggering event data regarding a product or products in response to user interaction with a mobile device in the venue;
   receiving product physical interaction data corresponding to user physical interaction associated with products for acquisition in each of the plurality of different zones in the venue, wherein the receiving product physical interaction data includes receiving product physical interaction data from a fixed mount camera in venue video camera system;
   receiving product physical interaction event data regarding a product in response to user physical interaction with the product in the venue, wherein the receiving the product physical interaction event data includes subjecting video data from the fixed mount camera in venue video camera system to recognition processing to classify the user's physical interaction with the product;
   receiving location data of the mobile device in the venue at the time of the receiving of the browser usage triggering event data and the product physical interaction event data;
   automatically determining that received mobile device browser usage triggering event data for a user, received product physical interaction event data for the user, and received location data for the user, at a first common time, match first specified firing conditions, the first specified firing conditions having a first browser usage event firing condition, a first product event firing condition, and a first location data firing condition that is satisfied when a user is located at a specified zone of the plurality of zones;
   automatically sending, in response to the first specified firing conditions being matched for the user, an associated first notification to a user mobile device of the user regarding acquisition of at least one product in the venue.

2. The system of claim 1, wherein the first specified firing conditions are satisfied when the user at the first common time performs a first browsing to search online for a product similar to the at least one product specified in the first notification, performs a first product interaction with the product to read a label of the product specified in the first notification, as detected with use of data from the fixed mount camera in venue video camera system, and is at a first zone of the venue that includes the product specified in the first notification.

3. The system of claim 1, wherein the first specified firing conditions are satisfied when the user at the first common time performs a first browsing to search online for a product similar to the at least one product specified in the first notification, performs a first product interaction with the product to hold the product specified in the first notification, as detected with use of data from the fixed mount camera in venue video camera system, and is at a first zone of the venue that includes the product specified in the first notification.

4. The system of claim 1, wherein the first notification is sent to the user in dependence on all of the following conditions being satisfied: (a) the user is in a venue zone having a product specified in the notification, (b) the user has physically held the product as detected by data of the fixed mount camera in venue video camera system, and (c) the user has used the browser of the user's mobile device to perform online searching of the product specified in the notification.

5. The system of claim 1, wherein the method includes automatically determining that received mobile device browser usage triggering event data for the user, received product physical interaction event data for the user, and received location data for the user, at a second common time, match second specified firing conditions, the second specified firing conditions having a second browser usage event firing condition, a second product event firing condition, and a second location data firing condition that is satisfied when a user is located at a specified second zone of the plurality of zones; and automatically sending, in response to the second specified firing conditions being matched for the user, an associated second notification to a mobile device of the user regarding acquisition of a product or products in the venue.

6. The system of claim 1, wherein the system includes a user interface that permits an administrator user, for a given notification, to specify a combination of activities for a patron, that will trigger the notification being sent, the combination of activities comprising (a) mobile device online browsing activity, (b) a product interaction activity, and (c) a venue zone occupancy activity.

7. The system of claim 1, wherein the system includes a user interface that permits an administrator user, for a first notification, to specify a first combination of activities for a patron that will trigger the first notification being sent, the first combination of activities comprising (a) a first mobile device online browsing activity, and permits the administrator user, for a second notification, to specify a second combination of activities for a patron that will trigger the second notification being sent, the second combination of activities comprising (a) second mobile device online browsing activity.

8. The system of claim 1, wherein the system includes a user interface that permits an administrator user, for a first notification, to specify a first combination of activities for a patron that will trigger the first notification being sent, the first combination of activities comprising (a) a first mobile device online browsing activity, (b) a first product interaction activity, and (c) a first venue zone being occupied, and permits the administrator user, for a second notification, to specify a second combination of activities for a patron that will trigger the second notification being sent, the second combination of activities comprising (a) second mobile device online browsing activity, (b) a second product interaction activity, and (c) a second venue zone being occupied.

9. The system of claim 1, wherein the receiving product physical interaction event data includes receiving product interaction data from a plurality of data sources, wherein the plurality of data sources include (a) the mobile device of the user; (b) the product, wherein the product is provided by an IoT enabled product that is able to sense interactions therewith by a user by including therein touch sensitive textile material having conductive fibers which conductive fibers produce an electrical signal in response to being touched; and (c) the fixed mount camera in venue video camera system.

10. The system of claim 1, wherein the recognition processing includes gesture recognition processing, and wherein the automatically sending includes using a decision data structure that associates specified product physical interactions and zone occupancies to notifications, wherein the decision data structure is configured so that the associated notification is sent when a plurality of conditions are satisfied at a common time, the plurality of conditions including first condition that the user is in a certain one zone of the different zones of the floor area of the venue, and a second condition that the user has physically handled the product in a specified way that is specified in the decision data structure.

11. The system of claim 1, wherein the method includes monitoring performance of the first notification, wherein the monitoring includes ascertaining whether the user acquired a product referenced in the first notification, wherein the method includes updating the decision data structure with use of machine learning in dependence on the monitoring, wherein the updating includes changing the first notification in dependence on a negative performance of the first notification.

12. The system of claim 1, wherein the triggering event data comprises use of a browser on the mobile device to view product related information, wherein the fixed mount camera in venue video camera system includes a shopping cart video camera disposed on a shopping cart, wherein the recognition processing includes gesture recognition processing for processing video data from the shopping cart video camera to determine that the user has placed the product into the shopping cart, and wherein the automatically sending includes using a decision data structure that associates specified product physical interactions and zone occupancies to notifications, wherein the decision data structure is configured so that the associated notification is sent when a plurality of conditions are satisfied at a common time, the plurality of conditions including first condition specified in the decision data structure that the user is in a certain one zone of the different zones of the floor area of the venue, a second condition specified in the decision data structure that the user has used a browser on the mobile device to view specified product related information, and a third condition specified in the decision data structure that the user has physically handled the product to place the product into the shopping cart.

13. The system of claim 1, wherein the receiving the physical product interaction event data includes (a) processing data from fixed mount camera in venue video camera system to ascertain the occurrence of a label reading gesture characterized by the user is reading a product label, (b) processing data from the fixed mount camera in venue video camera system to ascertain an occurrence of a "weighing" gesture by a user where a user lifts a product up and down in the air to estimate its weight, and (c) processing data from the fixed mount camera in venue video camera system to ascertain the occurrence of a "sizing" gesture by a user where a user holds the user's hands out with palms in parallel opposing spaced relation.

14. A computer implemented method comprising:
receiving floor area data corresponding to a floor area of a venue;
receiving zone data corresponding to a plurality of different zones of the floor area of the venue;
receiving mobile device browser usage trigger interaction data corresponding to mobile device interaction associated with products offered for sale in each of the plurality of different zones in the venue;

receiving notification data associated with products for acquisition in the plurality of different zones in the venue;

receiving mobile device browser usage triggering event data regarding a product or products in response to user interaction with the mobile device in the venue;

receiving product physical interaction data corresponding to user physical interaction associated with products for acquisition in each of the plurality of different zones in the venue, wherein the receiving product physical interaction data includes receiving product physical interaction data from a fixed mount camera in venue video camera system;

receiving product physical interaction event data regarding a product in response to user physical interaction with the product in the venue, wherein the receiving the product physical interaction event data includes subjecting video data from the fixed mount camera in venue video camera system to recognition processing to classify the user's physical interaction with the product;

receiving location data of the mobile device in the venue at the time of the receiving of the browser usage triggering event data and the product physical interaction event data;

automatically determining that received mobile device browser usage triggering event data for a user, received product physical interaction event data for the user, and received location data for the user, at a first common time, match first specified firing conditions, the first specified firing conditions having a first browser usage event firing condition, a first product event firing condition, and a first location data firing condition that is satisfied when a user is located at a specified zone of the plurality of zones;

automatically sending, in response to the first specified firing conditions being matched for the user, an associated first notification to a user mobile device of the user regarding acquisition of at least one product in the venue.

15. The computer implemented method of claim 14, wherein the first specified firing conditions are satisfied when the user at the first common time performs a first browsing to search online for a product similar to the at least one product specified in the first notification, performs a first product interaction with the product to read a label of the product specified in the first notification, as detected with use of data from the fixed mount camera in venue video camera system, and is at a first zone of the venue that includes the product specified in the first notification.

16. The computer implemented method of claim 14, wherein the first specified firing conditions are satisfied when the user at the first common time performs a first browsing to search online for a product similar to the at least one product specified in the first notification, performs a first product interaction with the product to hold the product specified in the first notification, as detected with use of data from the fixed mount camera in venue video camera system, and is at a first zone of the venue that includes the product specified in the first notification.

17. The computer implemented method of claim 14, wherein the first notification is sent to the user in dependence on all of the following conditions being satisfied: (a) the user is in a venue zone having a product specified in the notification, (b) the user has physically held the product as detected by data of the fixed mount camera in venue video camera system, and (c) the user has used the browser of the user's mobile device to perform online searching of the product specified in the notification.

18. The computer implemented method of claim 14, wherein the method includes automatically determining that received mobile device browser usage triggering event data for the user, received product physical interaction event data for the user, and received location data for the user, at a second common time, match second specified firing conditions, the second specified firing conditions having a second browser usage event firing condition, a second product event firing condition, and a second location data firing condition that is satisfied when a user is located at a specified second zone of the plurality of zones; and automatically sending, in response to the second specified firing conditions being matched for the user, an associated second notification to a mobile device of the user regarding acquisition of a product or products in the venue.

19. The computer implemented method of claim 14, wherein the system includes a user interface that permits an administrator user, for a given notification, to specify a combination of activities for a patron that will trigger the notification being sent, the combination of activities comprising (a) mobile device online browsing activity, (b) a product interaction activity, and (c) a venue zone occupancy activity.

20. A computer program product comprising:

a computer readable storage medium readably by one or more processing circuit and storing instructions for execution by one or more processor for performing a method comprising:

receiving floor area data corresponding to a floor area of a venue;

receiving zone data corresponding to a plurality of different zones of the floor area of the venue;

receiving mobile device browser usage trigger interaction data corresponding to mobile device interaction associated with products offered for sale in each of the plurality of different zones in the venue;

receiving notification data associated with products for acquisition in the plurality of different zones in the venue;

receiving mobile device browser usage triggering event data regarding a product or products in response to user interaction with the mobile device in the venue;

receiving product physical interaction data corresponding to user physical interaction associated with products for acquisition in each of the plurality of different zones in the venue, wherein the receiving product physical interaction data includes receiving product physical interaction data from a fixed mount camera in venue video camera system;

receiving product physical interaction event data regarding a product in response to user physical interaction with the product in the venue, wherein the receiving the product physical interaction event data includes subjecting video data from the fixed mount camera in venue video camera system to recognition processing to classify the user's physical interaction with the product;

receiving location data of the mobile device in the venue at the time of the receiving of the browser usage triggering event data and the product physical interaction event data;

automatically determining that received mobile device browser usage triggering event data for a user, received product physical interaction event data for the user, and received location data for the user, at a first common time, match first specified firing conditions, the first specified firing conditions having a first browser usage event firing condition, a first product event firing condition, and a first location data firing condition that is satisfied when a user is located at a specified zone of the plurality of zones;

automatically sending, in response to the first specified firing conditions being matched for the user, an associated first notification to a user mobile device of the user regarding acquisition of at least one product in the venue.

* * * * *